US006295875B1

(12) United States Patent
Frick et al.

(10) Patent No.: US 6,295,875 B1
(45) Date of Patent: Oct. 2, 2001

(54) PROCESS PRESSURE MEASUREMENT DEVICES WITH IMPROVED ERROR COMPENSATION

(75) Inventors: Roger L. Frick, Hackensack; Stanley E. Rud Jr., Victoria; David A. Broden, Andover, all of MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 09/312,411

(22) Filed: May 14, 1999

(51) Int. Cl.[7] .................................................. G01L 9/02
(52) U.S. Cl. ................................................................ 73/718
(58) Field of Search .................. 73/718, 724; 361/283.1, 361/283.3, 283.4

(56) References Cited

U.S. PATENT DOCUMENTS

| | | | |
|---|---|---|---|
| 2,533,339 | 12/1950 | Willenborg | 177/311 |
| 3,012,432 | 12/1961 | Moore et al. | 73/40 |
| 3,218,863 | 11/1965 | Calvert | 73/398 |
| 3,232,712 | 2/1966 | Stearns | 23/255 |
| 3,249,833 | 5/1966 | Vosteen | 317/246 |
| 3,374,112 | 3/1968 | Danon | 117/226 |

(List continued on next page.)

FOREIGN PATENT DOCUMENTS

| | | |
|---|---|---|
| 3340834 A1 | 5/1985 | (DE) . |
| 0 524 550 A1 | 1/1993 | (EP) . |
| WO 99/53286 | 10/1999 | (WO) . |

*Primary Examiner*—William Oen
(74) *Attorney, Agent, or Firm*—Westman, Champlin & Kelly, P.A.

(57) ABSTRACT

A device and method are able to compensate for diaphragm deformation (offset) and varying dielectric constants present in a process field environment. The device can be implemented as a pressure sensor or a transmitter having a pressure sensor. The pressure sensor, filled with a dielectric fill-fluid, includes at least three capacitor plates, disposed about a diaphragm. At least two capacitor plates are placed on one side of a conductive diaphragm, and are arranged in a particular manner with respect to the diaphragm. At least one capacitor plate is placed on the other side of the diaphragm. The method compensates for both diaphragm offset and variances in the dielectric constant of the fill-fluid. An error compensated measurement of differential pressure is a function of the amount of diaphragm deflection detected at the edge region subtracted from the amount of diaphragm deflection.

42 Claims, 19 Drawing Sheets

U.S. PATENT DOCUMENTS

| | | | |
|---|---|---|---|
| 3,557,621 | 1/1971 | Ferran | 73/398 |
| 3,697,835 | 10/1972 | Satori | 317/246 |
| 3,808,480 | 4/1974 | Johnston | 317/256 |
| 3,924,219 | 12/1975 | Braun | 338/34 |
| 4,008,619 | 2/1977 | Alcaide et al. | 73/398 |
| 4,158,217 | 6/1979 | Bell | 361/283 |
| 4,168,518 | 9/1979 | Lee | 361/283 |
| 4,177,496 | 12/1979 | Bell et al. | 361/283 |
| 4,227,419 | 10/1980 | Park | 73/724 |
| 4,287,553 | 9/1981 | Braunlich | 361/283 |
| 4,322,775 | 3/1982 | Delatorre | 361/283 |
| 4,336,567 | 6/1982 | Anastasia | 361/283 |
| 4,358,814 | 11/1982 | Lee et al. | 361/283 |
| 4,370,890 | 2/1983 | Frick | 73/718 |
| 4,389,895 | 6/1983 | Rud, Jr. | 73/724 |
| 4,422,125 | 12/1983 | Antonazzi et al. | 361/283 |
| 4,422,335 | 12/1983 | Ohnesorge et al. | 73/724 |
| 4,434,451 | 2/1984 | Delatorre | 361/283 |
| 4,455,874 | 6/1984 | Paros | 73/704 |
| 4,458,537 | 7/1984 | Bell et al. | 73/718 |
| 4,490,773 | 12/1984 | Moffatt | 361/283 |
| 4,542,436 | 9/1985 | Carusillo | 361/283 |
| 4,562,742 | 1/1986 | Bell | 73/718 |
| 4,670,733 | 6/1987 | Bell | 338/36 |
| 4,785,669 * | 11/1988 | Benson et al. | 73/718 |
| 4,860,232 | 8/1989 | Lee et al. | 364/571.04 |
| 4,875,369 | 10/1989 | Delatorre | 73/151 |
| 4,878,012 | 10/1989 | Schulte et al. | 324/60 |
| 4,926,674 | 5/1990 | Fossum et al. | 73/4 |
| 4,951,174 * | 8/1990 | Grantham et al. | 361/283.1 |
| 4,977,480 * | 12/1990 | Nishihara | 73/724 |
| 5,094,109 | 3/1992 | Dean et al. | 73/718 |
| 5,168,419 | 12/1992 | Delatorre | 361/283 |
| 5,194,819 * | 3/1993 | Briefer | 73/718 |
| 5,230,250 | 7/1993 | Delatorre | 73/733 |
| 5,233,875 | 8/1993 | Obermeier et al. | 73/718 |
| 5,329,818 | 7/1994 | Frick et al. | 73/708 |
| 5,492,016 | 2/1996 | Pinto et al. | 73/724 |
| 5,542,300 | 8/1996 | Lee | 73/724 |
| 5,637,802 | 6/1997 | Frick et al. | 73/724 |
| 5,642,301 | 6/1997 | Warrior et al. | 364/571.02 |
| 5,705,978 | 1/1998 | Frick et al. | 340/511 |
| 5,757,608 | 5/1998 | Bernot et al. | 361/283.4 |
| 5,911,162 | 6/1999 | Denner | 73/718 |
| 5,992,240 | 11/1999 | Tsuruoka et al. | 73/718 |

\* cited by examiner

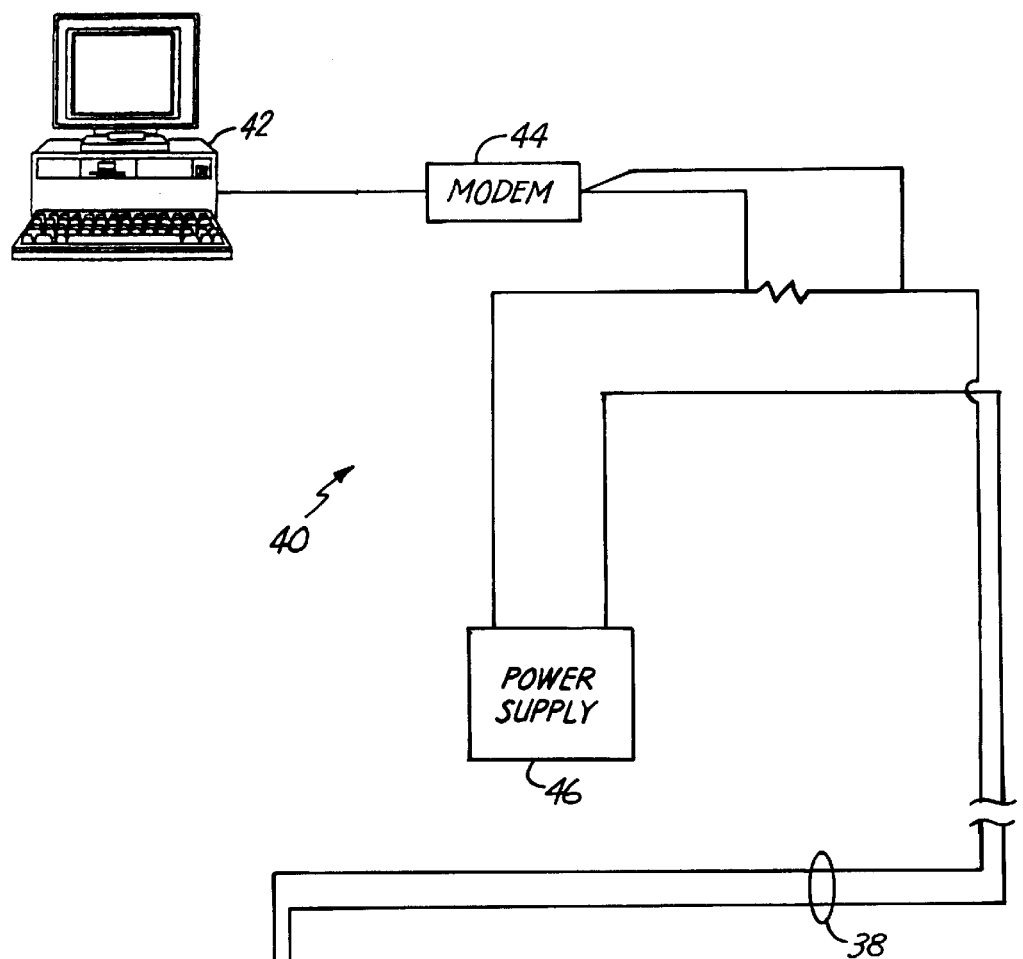
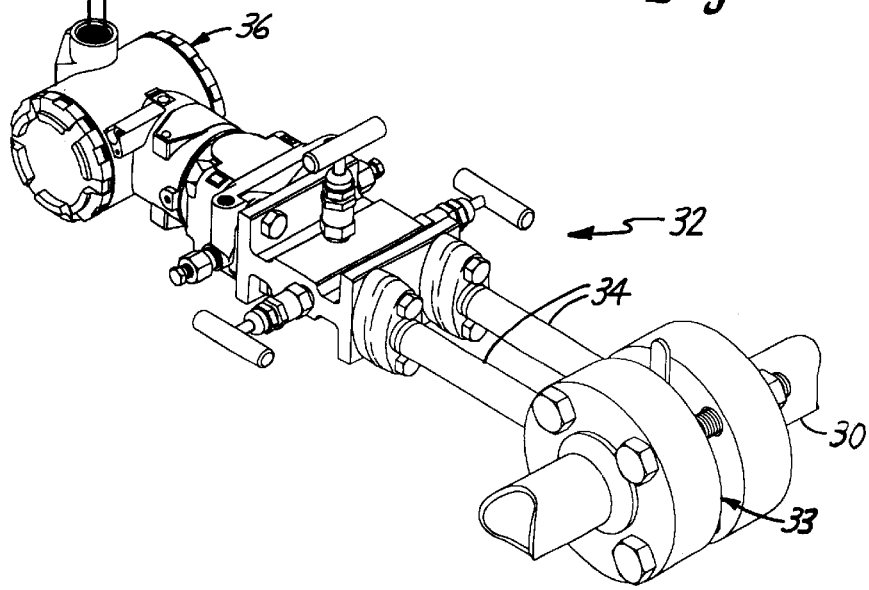
Fig. 1

PROCESS PRESSURE MEASUREMENT DEVICES WITH IMPROVED ERROR COMPENSATION

BACKGROUND

Generally defined, the term "process variable" refers to a physical or chemical state of matter or conversion of energy. Examples of process variables include pressure, temperature, flow, conductivity, pH, and other properties. The term "process measurement" refers to the acquisition of information that establishes the magnitude of process quantities. Pressure is considered a basic process variable in that it is used for the measurement of flow (the difference of two pressures), level (head or back pressure), and even temperature (fluid pressure in a thermal system).

An industrial process transmitter is a transducer that responds to a measured variable with a sensing element and converts the variable to a standardized transmission signal, e.g., an electrical or optical signal or air pressure, that is a function of the measured variable. Industrial process pressure transmitters are used with the pressure measurement of an industrial process such as slurries, liquids, vapors and gasses in chemical, pulp, petroleum, gas, pharmaceutical, food, and other fluid processing plants. Industrial process transmitters are often placed near the process fluids, or in field applications. Often, these field applications are subject to harsh and varying environmental conditions that provide challenges for designers of such transmitters.

The sensing element in many pressure transmitters is a capacitance sensor that includes a deflectable sensing diaphragm ("diaphragm") and two capacitor electrodes. A first type of sensing element includes a diaphragm, which is a conductive stretched membrane that deflects in response to pressures applied on both sides of the diaphragm, and two capacitor electrodes, one on each side of the diaphragm. A dielectric fill-fluid is used between the capacitor plates and the diaphragm. The fill fluid, used with an isolating diaphragm interfacing with the process fluid, prevents the process fluid, which at times can be harsh, corrosive, dirty or contaminated, from interacting with the components of the sensing element and perhaps damaging the components. A first capacitor electrode, on one side of the diaphragm, coupled with the conductive diaphragm forms a first capacitor. A second capacitor electrode, on the opposite side of the diaphragm, coupled with the diaphragm forms a second capacitor. The capacitance of each capacitor changes in proportion to the inverse of the distance between the capacitor plate and the diaphragm. Thus, the capacitance of each capacitor changes as the diaphragm deflects in response to the applied pressures. The amount of deflection is related to the difference between the two applied pressures, or differential pressure. The differential capacitance between each capacitor plate and the conductive diaphragm is detected and is used to provide the standardized transmission signal, which is related to differential pressure.

The sensing element is particularly adapted to detect diaphragm deflection in a process field environment. The approximate relationship between the capacitance, C, and the distance between one of the capacitor plates, X, is $C=\epsilon K/X$, where $\epsilon$ is the permittivity of the fill-fluid and K is a constant depending on several factors such as the geometry of the sensing element. The permittivity $\epsilon$ of a typical fill-fluid is sensitive to changes in a process field environment. The permittivity $\epsilon$ typically varies by approximately 15% over typical temperature ranges of a fill fluid in process field environments. The sensing element with two opposing capacitors is configured such that the output is generally independent of a varying permittivity. The two capacitors in the sensing element generally provide an output related to the ratio $(C_1-C_2)/(C_1+C_2)$, where $C_1$ is representative of the capacitance of the first capacitor and $C_2$ is representative of the capacitance of the second capacitor in the sensing element. The permittivity $\epsilon$ in the numerator cancels the permittivity in the denominator of this ratio. Accordingly, the sensing element is generally insensitive to temperature changes of a fill fluid in a process field environment.

A second type of capacitive sensing element is known, but unlike the first type of sensing element described above, the second type of sensing element is not suited for measuring differential pressure. Instead, the second type of sensing element is used to measure absolute pressure. The second type of sensing element has two capacitor plates, forming two capacitors, on one side of the diaphragm, rather than on opposite sides of the diaphragm. The second type of sensor does not use a fill-fluid. Absolute process pressure is applied to the sensor diaphragm on the side opposite the electrodes. The second type of sensor includes a ceramic substrate to position two capacitor electrodes the same distance from the undeflected conductive diaphragm. The two capacitor electrodes are positioned in a plane on one side of the diaphragm in order to compensate for undesired motion of the ceramic substrate. The sensor output is related to the difference of the capacitances. The sensor detects curvature of the parabolically deflected diaphragm, and the sensor output cancels or disregards piston-like movement of the ceramic substrate that typically occurs as a result of temperature changes. The second type sensor is not suited for use with a fill fluid on the electrode side of the diaphragm because the transfer function that compensates for piston-like motion of the substrate is unable to compensate for changes in the permittivity of that fill fluid as the, temperature changes.

The ability to detect the curvature of the deflected diaphragm in a field process environment has advantages over merely the ability to detect the amount of deflection of the diaphragm. Ideally, the displacement of the diaphragm is proportional to the differences in the pressures applied to both sides of the diaphragm. Unfortunately, the diaphragm does not deflect in an ideal manner. Due to physical forces inherent in stretched membranes, diaphragms are often deformed after they have been deflected. This deformation can be described as an "offset," where the very edges of the diaphragm are bent in such a way so that the flat portion of the diaphragm is spaced closer to one of the electrodes than the it is in an ideal spacing, i.e., the edges are bent so as the flat central portion protrudes toward one or the other of the electrodes. The offset is not detected by merely sensing the diaphragm deflection in the sensing element of the first type, and this offset causes inaccurate readings of the process pressure. These inaccurate readings have gone uncompensated for at least two reasons. First, there was a lack of appreciation of the source of these errors and the resulting diaphragm offset. Second, the sensing elements and transmitters currently available are unable to separate curvature from offset in a measurement of deflection, and still compensate for varying permittivity due to changing temperatures in a process field environment.

SUMMARY OF THE INVENTION

The invention is directed to a new device and method that provide for improved error compensation in the measurement of process pressure. The new device and method are able to compensate for diaphragm offset and varying permittivity present in a process field environment. Early tests have demonstrated that the new device and method significantly improve the accuracy of process pressure measurement and can reduce some offset errors by at least an order of magnitude.

One aspect the invention is directed to an improved sensing element, or pressure sensor. The pressure sensor, filled with a dielectric fill-fluid, includes at least three capacitor electrodes, disposed about a diaphragm. At least two capacitor electrodes are placed on one side of a conductive diaphragm, and are arranged in a particular manner with respect to the diaphragm. At least one capacitor electrode is placed on the other side of the diaphragm. For example, the sensor includes a cell body having an interior cavity filled with the dielectric fill-fluid. The deflectable diaphragm with a conductive portion is stretched across the interior cavity and separates the interior cavity into two smaller cavities. At least two electrodes are coupled to the cavity wall within the first of the two smaller cavities. One of the electrodes is closer to the center of the cavity wall than is the other electrode, i.e., one of the electrodes is in a "center region" and the other electrode is in an "edge region." Within the second of the two smaller cavities, at least one electrode is coupled to the cavity wall. In one embodiment of this aspect, each of the two smaller cavities includes two electrodes coupled to the respective cavity walls. This embodiment makes use of four capacitive electrodes.

Another aspect of the invention is directed to an improved process pressure transmitter. The process pressure transmitter includes the pressure sensor electrically coupled to an analog to digital converter such that the electrodes of the pressure sensor provide an input to the analog to digital converter. One type of analog to digital converter is a capacitance to digital converter. In one embodiment, the electrodes are coupled together either directly or through circuit elements and then provided to the analog to digital converter. This embodiment permits coupling the sensor to existing analog to digital circuits. Other embodiments contemplate the use of specially-designed analog to digital circuits. The transmitter is suitable for use in a process field environment.

Still another aspect of the invention is directed to an improved method of measuring diaphragm deflection in process pressure sensors. Specifically, the improved method measures curvature of the diaphragm as separate from offset and compensates for variances in the permittivity of the fill-fluid. An error compensated measurement of differential pressure is a function of the amount of diaphragm deflection detected at the edge region subtracted from the amount of diaphragm deflection detected at the center region. One method measures the changes in capacitances from two capacitor electrodes on each side of the diaphragm, and combines these values to achieve an error compensated output representative of the applied differential pressure. The method can be performed with a basic transfer function. This basic transfer function can be implemented in variety of ways, and each way includes a more specific transfer function. The transfer functions can be implemented through hardware or software.

The present invention significantly reduces errors due to diaphragm offset, or "offset errors." One type of offset error is called "pressure hysteresis error." For example, as the process pressure moves up-scale from a lower value to a higher value, the sensor will provide an output at points along the path. However, as the process pressure then move down-scale from the higher value toward the lower value, the output may differ at the same points. The separation between the up-scale output and the down-scale output at a point is the pressure hysteresis error. The ideal output, i.e., an output that precisely corresponds with the input, is often somewhere between the up-scale output and the down-scale output, and the actual output is often not an accurate representation of the process pressure. Prior art sensors may generate an output that includes pressure hysteresis errors of about 0.11%, whereas the present invention provides an output with pressure hysteresis errors of less than about 0.01%. The present invention also significantly reduces offset errors known in the art such as overpressure zero return hysteresis, zero line pressure error, zero temperature hysteresis error, and improves long term zero drift.

BRIEF DESCRIPTION OF THE DRAWINGS

FIG. 1 shows a process measurement system with a process transmitter constructed in accordance with the present invention.

DESCRIPTION

Figure 2:
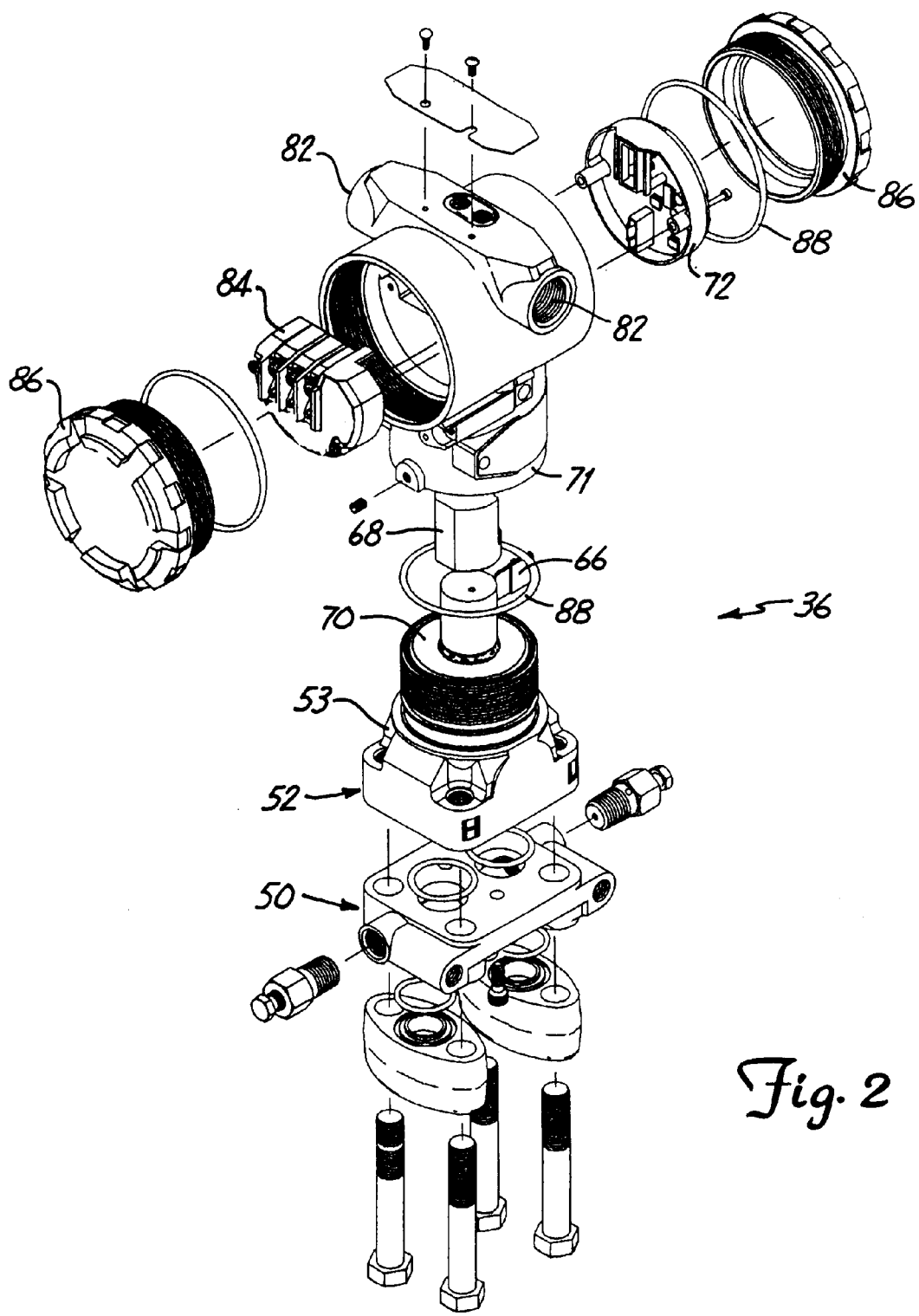
FIG. 2 shows an exploded view of the process transmitter of FIG. 1.

In the following description, reference is made to the accompanying drawings. The drawings and description provide specific examples, or "embodiments," of how the invention may be made or used, or "practiced." The scope of the invention includes the specific examples, and other examples, and should not be limited to the examples of the sensors, transmitters, or methods described here, or any specific feature of the sensors, transmitters, or methods. Methods of error compensation in measuring process pressure are presented with reference to the sensor and transmitter. But these methods are independent of the sensors and transmitters, and can be used with other sensors and transmitters, or with sensors and transmitters not yet known. Other examples are contemplated and will fall within the scope of the invention even if they were developed after the disclosed examples. Changes can be made to the described embodiments without departing from the spirit and scope of the protected invention, which is defined by the appended claims.

FIG. 1 shows generally the environment of a process measurement system 32. FIG. 1 shows process piping 30 containing a fluid under pressure coupled to the process measurement system 32 for measuring a process pressure. The process measurement system 32 includes impulse piping 34 connected to the piping 30. The impulse piping 34 is connected to a process pressure transmitter 36. A primary element 33, such as an orifice plate, venturi tube, flow nozzle, and so on, contacts the process fluid at a location in the process piping 30 between the pipes of the impulse piping 34. The primary element 33 causes a pressure change in the fluid as it passes past the primary element 33.

Transmitter 36 is a process measurement device that receives process pressures through the impulse piping 34. The transmitter 36 senses the process pressures and converts it to a standardized transmission signal that is a function of the process pressure. Transmitters can also sense multiple process variables or can be configured to provide process control functions. In the example, transmitter 36 is a differential pressure transmitter. Differential pressure is the difference in magnitude between two pressure values, e.g., the difference between two process pressures input to a transmitter. The measurement of differential pressure includes the measurement of gage pressure where the reference pressure input to the transmitter is atmospheric pressure, and also includes the measurement of absolute pressure where the reference pressure input to the transmitter is a vacuum. FIG. 1 shows the transmitter configured to measure flow. Other uses of the transmitter for differential pressure measurement, however, are contemplated.

A process loop 38 facilitates both a power signal to the transmitters 36 and bidirectional communication, and can be constructed in accordance with a number of process communication protocols. In the illustrated example, the process loop 38 is a two-wire loop. A two-wire loop, as the name implies, uses only two wires to electrically connect the transmitter 36 to a remote control room 40. The two-wire loop is used to transmit all power to and all communications to and from the transmitter 36 during normal operations with a 4–20 mA signal. Accordingly, the transmitter 36 as illustrated often is referred to as a "two-wire transmitter," although other configurations, such as three-wire and four-wire transmitters, and so on, are known and contemplated. Communication can be performed with a 4–20 mA analog signal, and the open protocol HART® (Highway Addressable Remote Transducer) digital communications format that provides simultaneous digital communications with the 4–20 mA signal. Communication can also be performed with open and interoperable protocol FOUNDATION™ Fieldbus that provides a digital communication link among intelligent field level and control devices. The transmitter 36 can be configured for use with other process protocols, including Device Bus, Sensor Bus, Profibus, the ethernet, and others in use throughout the world. A computer 42 or other information handling system through modem 44, or other network interface, is used for communication with the transmitter 36. A remote voltage power supply 46 powers the transmitter 36.

Figure 3:
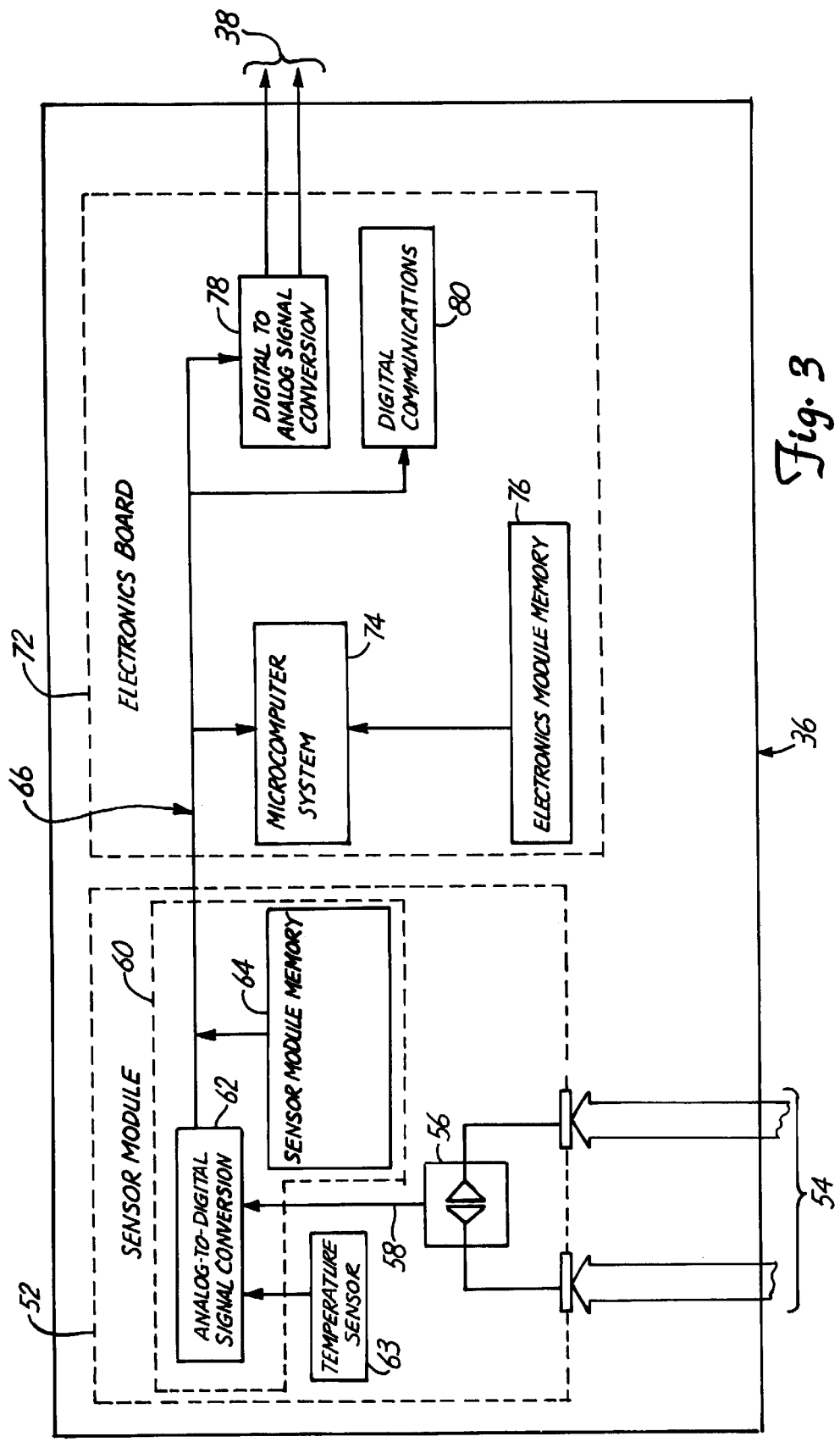
FIG. 3 shows a functional block diagram of the process transmitter shown in FIG. 1.

FIG. 2 shows an exploded view of the transmitter 36. Flange 50 is attached to a sensor module 52 to interface with impulse piping 34. The sensor module 52 includes a threaded housing 53 that is an all welded design to isolate internal components from the process medium and the field environment. FIG. 3 shows a block diagram of transmitter 36 corresponding with FIG. 2. A process pressure 54 is applied to the sensor module 52. A pressure sensor 56, isolated mechanically, electrically, and thermally from the process medium receives the process pressures 54 and provides an analog electrical signal 58 representative of differential pressures. The signal 58 is processed and converted to a digital signal at sensor module electronics 60 that includes an analog to digital converter 62 and a sensor module memory 64. Memory 64 contains specific information about the sensor module and correction coefficients for the sensor module 52. A temperature sensor 63 provides an analog signal representative of ambient temperature to the sensor electronics 60. The digital signal is output over a multi-pin cable 66. As indicated in FIG. 2, the multi-pin cable 66 is implemented as a retractable tape enclosed by a cover 68 on the cap 70 of the sensor module 52.

An electronics housing 71 carries transmitter components that interface with the sensor module 52 and loop 38. The multi-pin cable 66 plugs into an electronics board 72. FIG. 3 shows that the electronics board includes a microprocessor system 74 and memory 76 that are used to further condition the digital signal. A digital to analog converter 78 or digital communication circuitry 80 is used to generate and receive either an analog or digital transmission signal over the loop 38, and is therefore often referred to as a "communication circuit." The loop 38 is connected to the transmitter through openings 82, as shown in FIG. 2. A terminal block 84 is electrically connected to the electronics board 72 to provide direct access to the generated signals. The electronics housing 71 receives the sensor module 52 and caps 86 with o-rings 88 to provide an explosion proof housing in an assembled transmitter 36 suitable for field installation. The housing protects the transmitter electronics that are within the sensor module 52 and the electronics housing 71.

Figure 4:
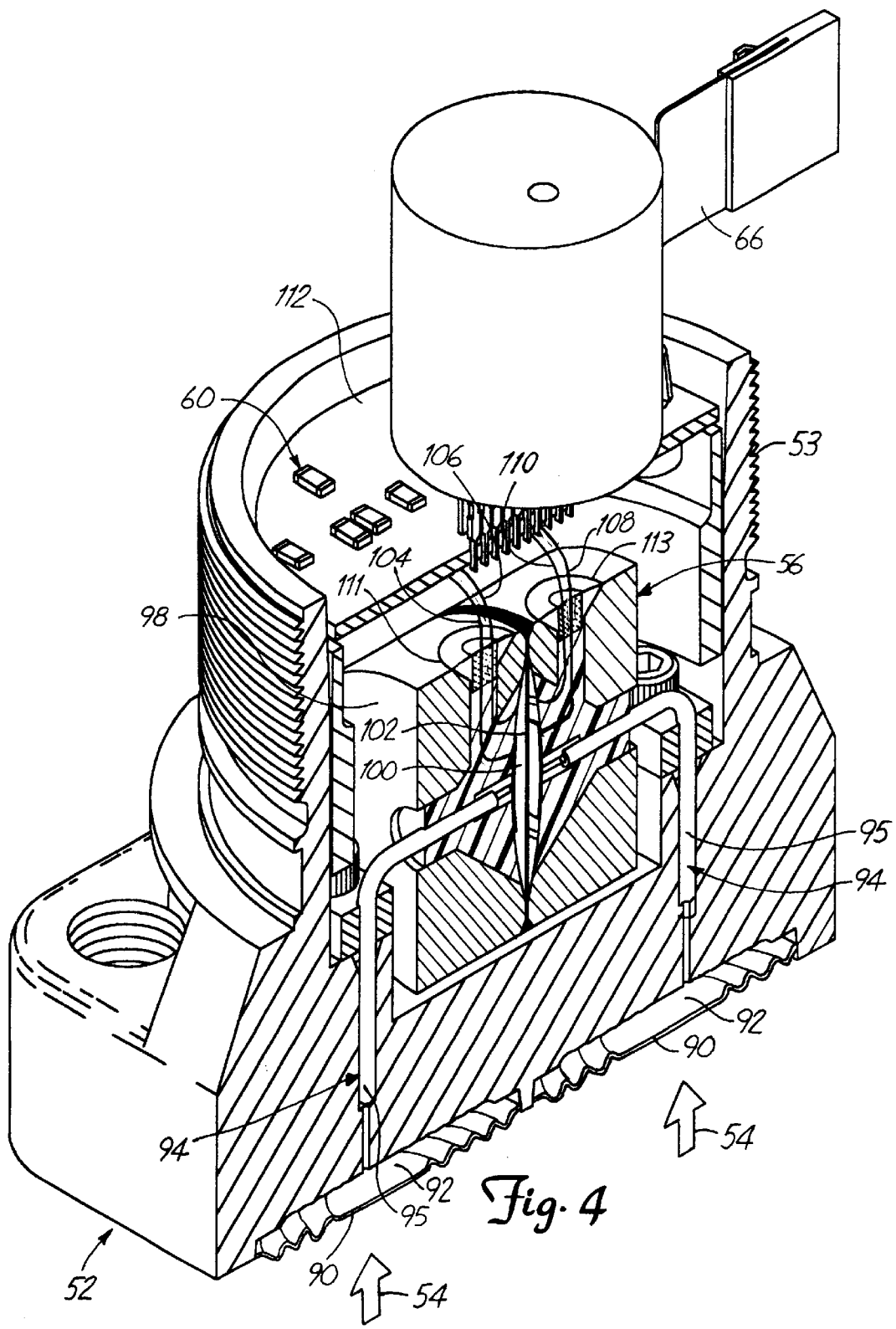
FIG. 4 shows a perspective view of a sectioned sensor module and pressure sensor, which are portions of the transmitter of FIG. 1.

FIG. 4 shows a sectioned view of the sensor module 52. Differential process pressures 54, typically in the form of a fluid (gas or liquid) is applied to the sensor module 52 at isolation diaphragms 90. Each isolation diaphragm 90 deflects in response to the applied process pressures 54 within its isolation chamber 92. The isolation chambers 92 are in communication with isolation tubes 94 filled with a fill-fluid 95 that transfer the applied process pressures 54 to a sensor 56, which is also indicated schematically in FIG. 3 at reference number 56. The isolation diaphragms 90 serve to protect the sensor 56 from the process fluid, which can be corrosive or otherwise detrimental to the sensor 56. The sensor 56 includes a cell body 98 with an interior cavity 100 filled with the fill-fluid 95. A diaphragm 102, often referred to as a sensing diaphragm, separates the interior cavity 100 into two generally equal and opposite cavity halves, and deflects in response to the process pressure 54 as transferred into the interior cavity 100. The displacement of the deflected diaphragm 102 is proportional to the difference in pressure between the two halves of the cavity 100. The position of the diaphragm 102 with respect to the cavity 100 is detected with capacitor electrodes (describe in detail below) within the cavity 100. Lead wires 104, 106, 108, 110 extend through openings 111 and 113 and connect capacitor electrodes to a sensor electronics board 112, containing sensor electronics 60. Thus, the sensor 56 converts the differential process pressure into an analog electrical signal, and the sensor electronics 60 convert the analog electrical signal into a digital electrical signal.

Figure 5:
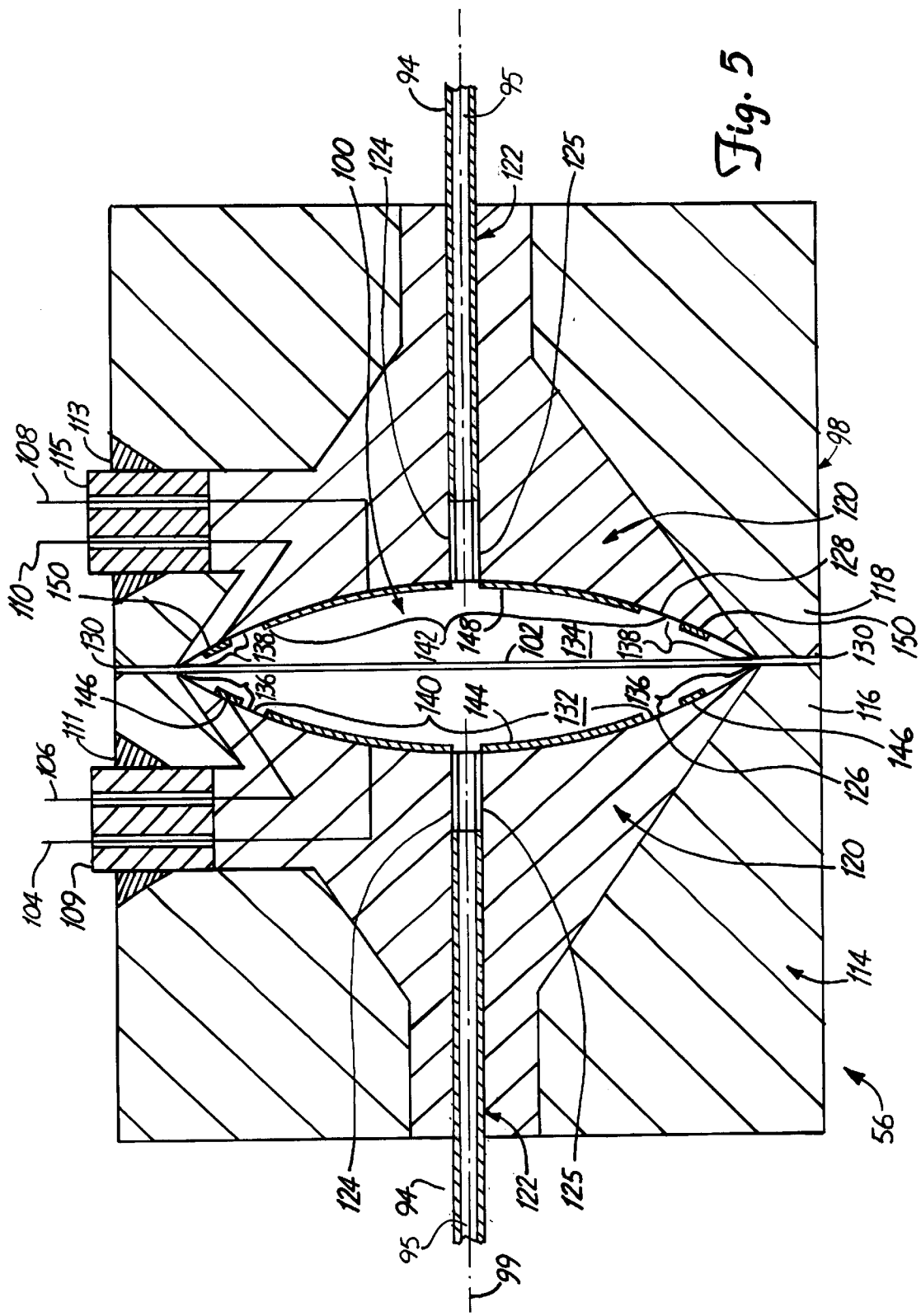
FIG. 5 shows a side sectioned view of the pressure sensor of FIG. 4.
Figure 6:
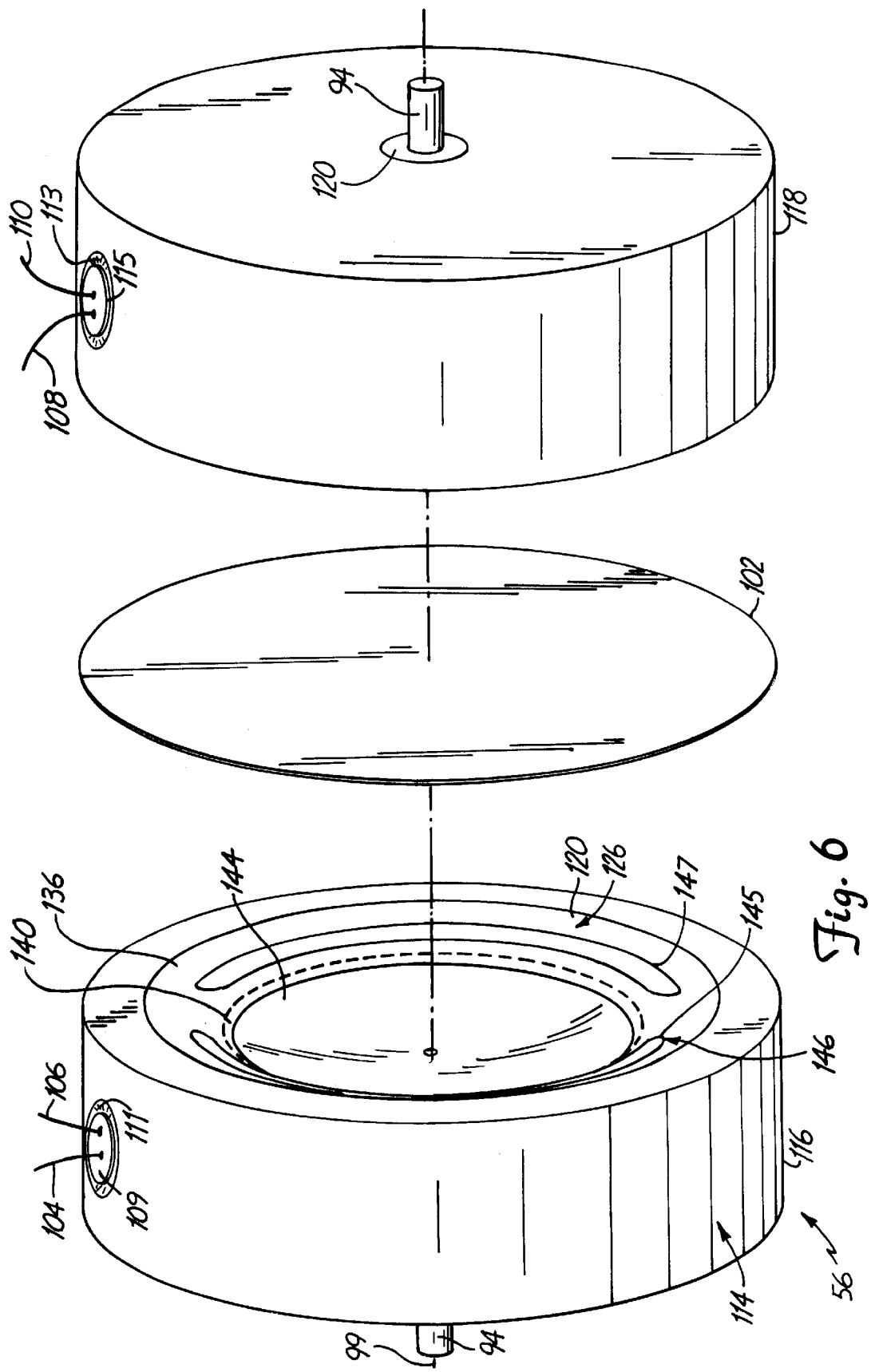
FIG. 6 shows a partially exploded view of the pressure sensor of FIG. 4.

FIG. 5 shows a detailed side view of the sensor 56 as sectioned in FIG. 4, and FIG. 6 shows a partially exploded perspective view of the sensor 56. The cell body 98 can be made from any suitable materials used to manufacture capacitance type pressure sensors. In the example shown, the cell body 98 includes a metal housing 114 that is formed of two cup-like halves 116, 118 prior to assembly. The cup-like halves 116, 118 are each filled with a rigid insulator 120 such as ceramic or glass that is fused to the metal housing 114. The insulator 120 includes openings 122 in communication with isolation tubes 94. Each opening 122 is in communication with openings 124 in ceramic tubes 125, where the openings 124 extend through the insulator 120 and into the interior cavity 100. Each of the halves 116, 118 is machined so as to form a concave surface in at least the insulator 120 and tube 125. A portion of the cell body 98 is also machined to be concave in the example shown. This concave surface is referred to as a first interior wall 126 in the first half 116 and a second interior wall 128 in the second half 118. The concave interior walls 126, 128 in the example shown are, at least in part, generally spherical. The concave interior walls 126, 128 are opposite from each other and form and define the interior cavity 100 in an assembled sensor 96. As one alternative to a concave surface, the cell body can include a rectangular recess that creates two generally opposite interior walls.

The diaphragm 102 is placed between the two halves 116, 118, stretched taut, and welded into place with a continuous weld bead 130. The bead weld 130 joins together and hermetically seals the halves 116, 118 to form the cell body 98. The weld 130 also holds the diaphragm 102 under a desired amount of tension so it can act as a deflectable spring element that, when subjected to a force, can be urged toward one or the other of the first and second interior walls 126, 128. At least a portion of the diaphragm 102 includes an electrically conductive material. In the example shown in FIGS. 5 and 6, the diaphragm 102 is a thin metal membrane, so the entire diaphragm 102 is conductive. An axis 99, for reference, is shown extending perpendicularly from the center of the diaphragm 102 and through the cell body 98.

The diaphragm 102 separates the interior cavity 100 into a first cavity 132 and a second cavity 134. In the example shown, the diaphragm 102 and the first interior wall 126 define the first cavity 132. The diaphragm 102 and the second interior wall 128 define the second cavity 134, which is generally opposite the diaphragm 102 from the first cavity 132. The interior walls 126, 128 are separated into edge regions 136, 138, respectively, and center regions 140, 142, respectively. The portions of each interior wall 126, 128 proximate the region where the interior wall 126, 128 contacts the diaphragm 102 are the edge regions 136, 138. Likewise, the portions of each interior wall 126, 128 including the region where the axis 99 extends through the interior walls 126, 128 are the center regions 140, 142. The edge regions 136, 138 of each interior wall 126, 128 surround the respective center regions 140, 142. The ratio of the area of the edge regions 136, 138 and center regions 140, 142 can vary. In the example shown, the insulator 120 extends to the diaphragm forming the interior walls 126, 128. In other versions, the insulator 120 does not extend to the diaphragm 102, and the interior walls 126, 128 include a region formed in the cup-like halves 116, 118, this region proximate the diaphragm 102.

Dielectric fill-fluid 95 fills each of the first cavity 132, the second cavity 134, openings 122, isolation tubes 94, and isolation chambers 92. During manufacture of the sensor 96, the fill-fluid 95 is injected into the sensor 96 to fill in the isolation tubes 94. The fill-fluid 95 is compatible with the sensor 56, and examples of known dielectric fill-fluids include silicone oil, inert halocarbon, and others. In the example, the same type of fill-fluid 95 is used in both cavities 132, 134. The dielectric fill-fluid 95 substantially increases the capacitance of the sensor 96 over a comparable air-filled device, but the dielectric constant of the fill-fluid 95 varies as a function of temperature and pressure. Generally the volume of fill-fluid 95 in the first cavity is equal to the volume of fill-fluid 95 in the second cavity 134. As one or both of the isolation diaphragms 90 deflect or flex, fill-fluid 95 is displaced in the cavities 132, 134, and the fill-fluid 95 exerts a force against the diaphragm 102. This force generally corresponds with the force applied to the isolation diaphragms 90 by the variable process pressure 54. Differences between the forces exerted on the diaphragm from each cavity cause the diaphragm to deflect, or be displaced.

In one version, the diaphragm 102 will touch and rest against either of the interior walls 126, 128 before either of the isolation diaphragms 90 are fully deflected within their respective isolation chambers 92 and before remarkable damage will result to the diaphragm 102. In this manner, the interior walls 126, 128 act as over-pressure stops and protect the diaphragm 102. Similarly, the spherical shape of the concave interior walls 126, 128 is such that generally the entire diaphragm 102 will rest against either wall 126 or 128 to protect the diaphragm 102 from localized permanent deformations.

A thin metal coating, or a first "electrode" 144, is coupled to the first interior wall 126. In the example shown, the first electrode 144 is deposited on the first interior wall 126 and positioned within the first interior cavity 132. Methods of depositing the electrodes include sputtering, physical or chemical vapor deposition, plasma deposition, silk screening, or other suitable methods of coupling the electrode to the interior wall. The thickness of the electrode is exaggerated in the Figures for clarity. The electrode 144 is in the center region 140 of the first interior wall 126, is proximate the ceramic tube 125, and is opposite the first interior cavity 126 from the diaphragm 102. The first electrode 144 is directly connected to lead wire 104 that is imbedded in the insulator 120 and extends through ceramic plug 109 in opening 111.

A second electrode 146 also is coupled to the first interior wall by a suitable deposition method. In the example shown, the second electrode 146 is sputtered on the first interior wall 126 within the first interior cavity 132, and is opposite the first interior cavity 132 from the diaphragm 102. The thickness of the electrode is exaggerated in the Figures for clarity. The second electrode 146 is in edge region 136, or at a distance further along the interior wall 126 from the axis 99 than the distance of the first electrode 114 along the interior wall 126 from the axis 99. The electrodes 144, 146 are spaced-apart across the insulator 120 from each other and the diaphragm, so that the electrodes do not directly contact each other or the diaphragm. In the example shown in FIG. 6, the second electrode 146 extends around the first electrode 144. The second electrode 146 is directly connected to lead wire 106, which is spaced-apart from and not in direct contact with lead wire 104, and also extends through ceramic plug 109 in opening 111. A thin deposit of silicon monoxide (not shown) or other suitable insulator covers the electrodes 144, 146 to prevent direct contact with the diaphragm 102 in over-pressure situations.

Figure 7:
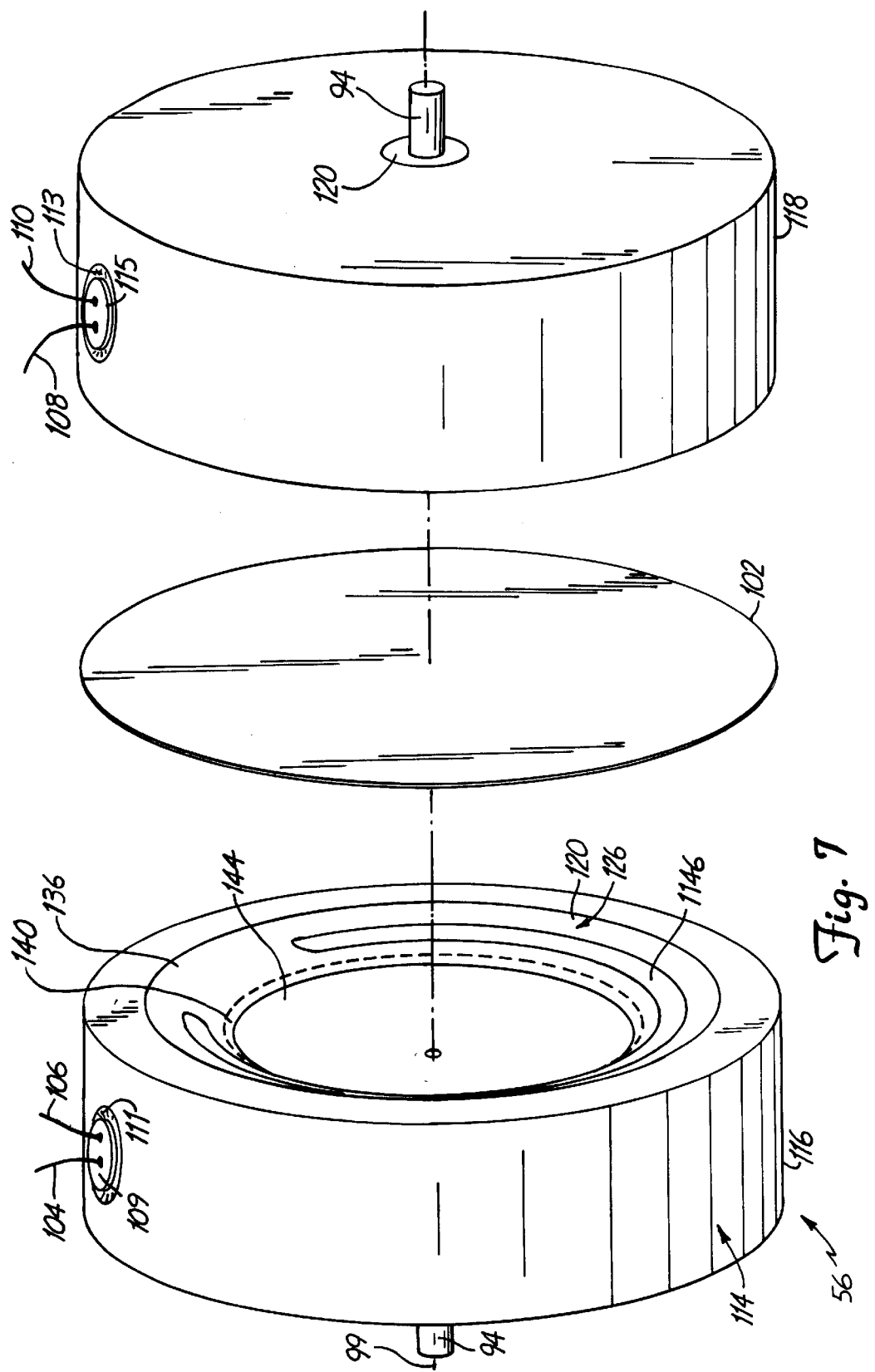
FIGS. 7–9 show partially exploded views of other pressure sensors constructed in accordance with the present invention.
Figure 8:
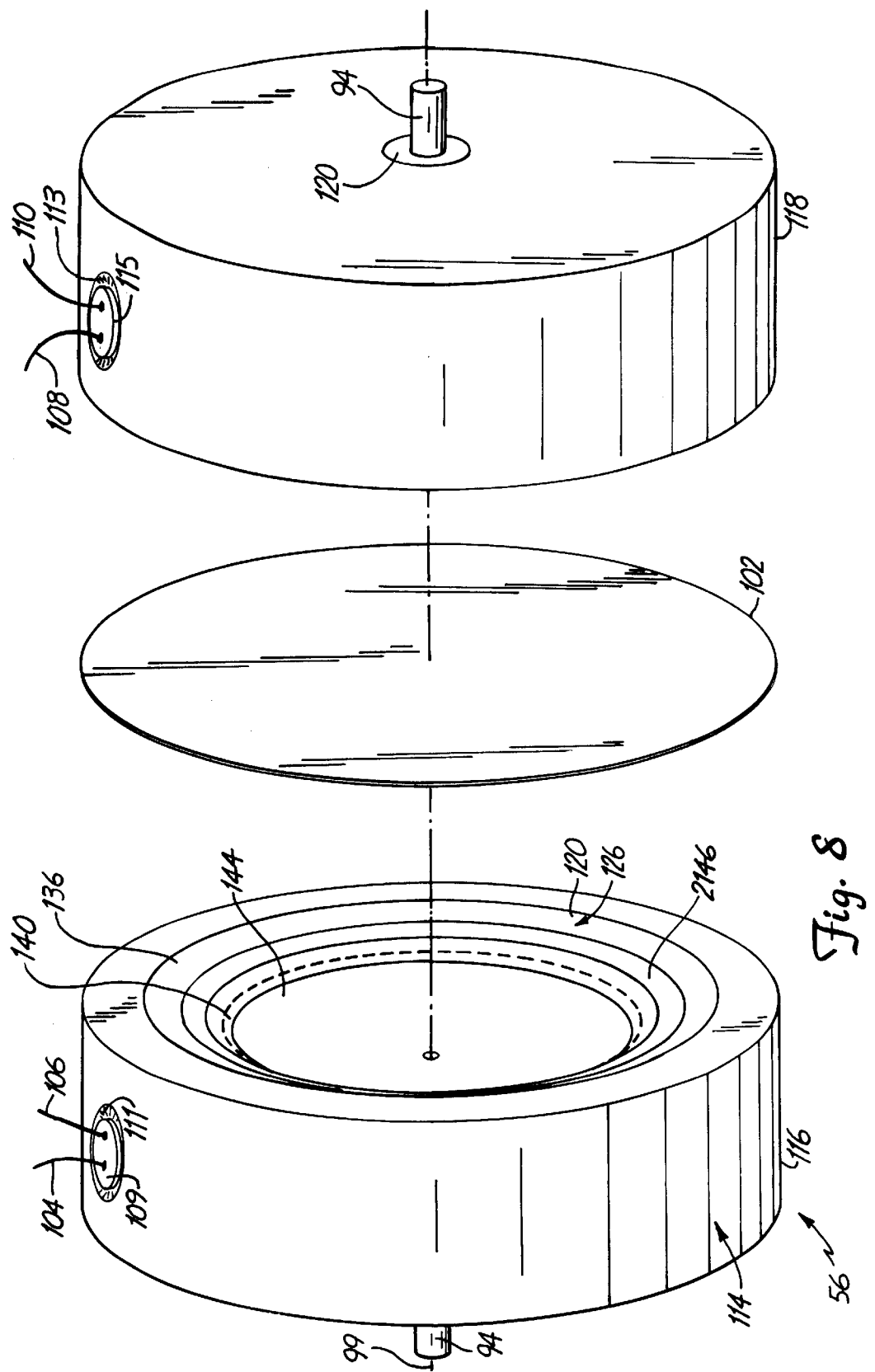
Figure 9:
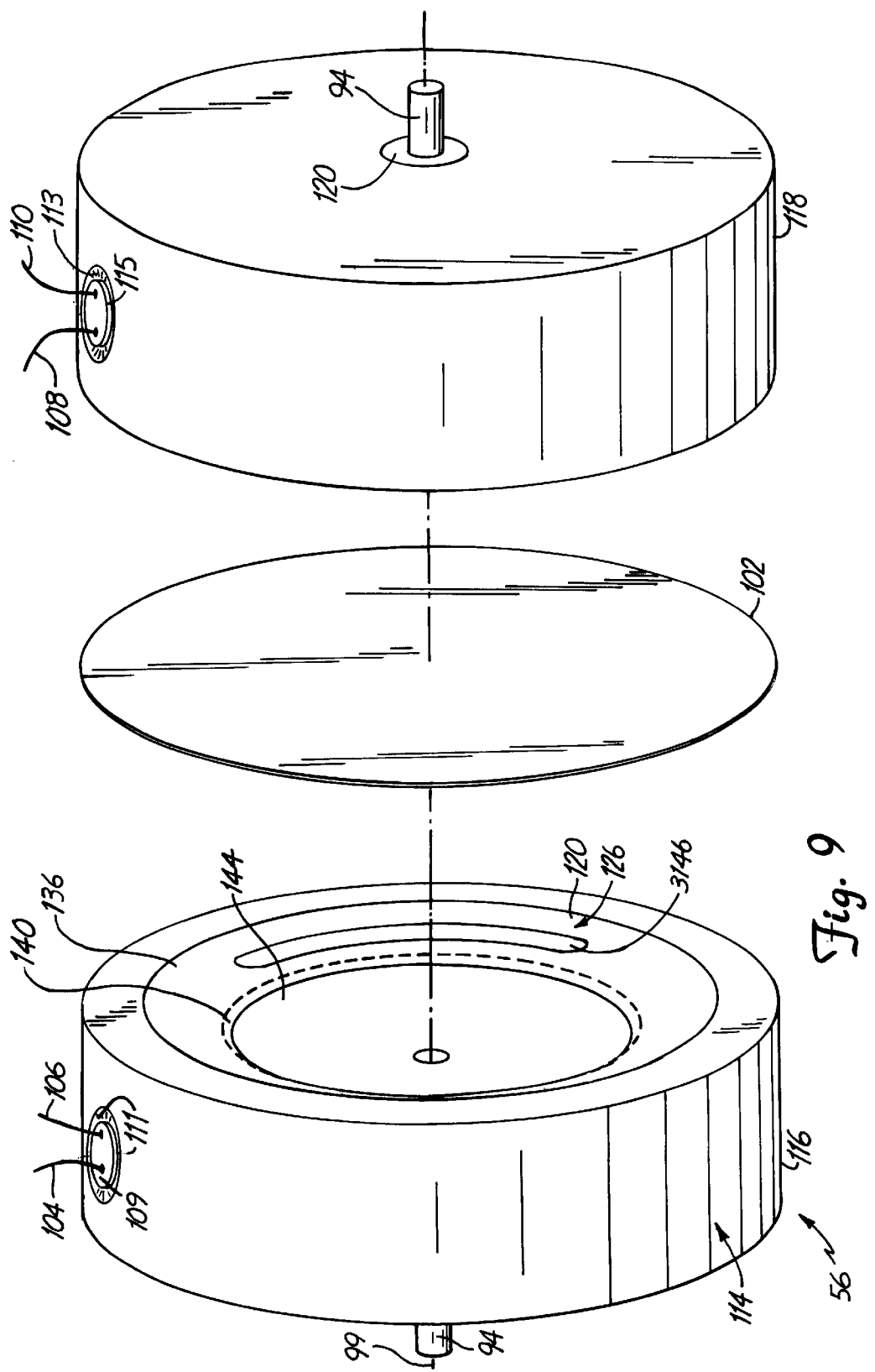

The electrodes 144, 146, 148, 150 can be of a variety of configurations. FIG. 6 shows that the second electrode 146 is formed of two electrode-halves 145 and 147, in the edge region 136, that surround the first electrode 144. The electrode halves 145, 147 are spaced-apart from one another on the first interior wall 126, but are directly coupled together within insulator 120 of the cell body 98 and to lead wire 106. FIGS. 7–9 show other examples of the sensor 56. In FIG. 7, electrode 1146 is analogous to the electrode 146 of FIG. 6, and is the "second electrode." Electrode 1146 extends only partially around the first electrode 144, and is also coupled to lead wire 106. In FIG. 8, electrode 2146 is the "second electrode" and is in the shape of a ring that completely surrounds the first electrode 144. In FIG. 9, electrode 3146 is the "second electrode" and is of an arbitrary shape in the edge region 136. Other shapes or configurations of the second electrode are contemplated. For example, the "second electrode" can be merely the end of the lead wire 106 left exposed to the interior cavity 100 with no other metal coat coupled to the first interior wall 126. The various shapes for the second electrode 146 can also be used with the fourth electrode 150. Similarly, the first and third electrodes 144, 148 can be of a variety of shapes. For example the first and third electrodes 144, 148 can be pie-shaped or an arbitrary shape.

The electrodes 144, 146 operate as capacitor elements, or capacitor plates, and each are electrically coupled via an electric field, i.e. "capacitively coupled," across the dielectric fill-fluid 95 to the diaphragm 102. The diaphragm 102 also operates as another capacitor plate, and there is no direct connection between the diaphragm 102 and either electrode 144 or 146. Thus, the first electrode 144 and the diaphragm 102 form a first capacitor, and the second electrode 146 and the diaphragm 102 form a second capacitor. The term "capacitor" is used to describe the structure even though the "capacitor plates" (including the diaphragm) are not always charged. Thus, for example, the first electrode 144 and the diaphragm 102 are considered "capacitively coupled" even when they are not charged. The diaphragm 102 operates as a capacitor plate common to both the first and second capacitors. Electrodes 144, 146 are fixed with respect to the movable diaphragm 102, and thus the first and second capacitors are "variable capacitors." The capacitance of each variable capacitor will change as the diaphragm is deflected. Specifically, the capacitance of a capacitor generally is proportional to the inverse of the distance between the capacitor plates of the capacitor.

During operation, the sensor electronics 60 provides a signal to charge the diaphragm 102. As the diaphragm 102 deflects within the interior cavity 100 in response to the applied process pressure, the distance between the diaphragm and each electrode 144, 146 changes. This creates a change in the capacitance of each capacitor, which is a function of the process pressure 54. The lead wires 104, 106 and diaphragm 102 are each directly coupled to the sensor electronics board 112. The charge on electrode 144 and lead wire 104 is a function of the capacitance of the first capacitor, and the charge on electrode 146 and lead wire 106 is a function of the capacitance of the second capacitor. The sensor electronics 60 measures the variable capacitances, which can be used to establish the applied process pressure.

A third electrode 148 is coupled to the second interior wall 128 and positioned within the second interior cavity 134. One method of coupling the electrode 148 is through sputtering. The thickness of the electrode is exaggerated in the Figures for clarity. The third electrode 148 is in the center region 142 of the second interior wall 128, is opposite the second interior cavity 128 from the diaphragm 102, is similar in size and shape to the first electrode 144, and is opposite the interior cavity 100 from the first electrode. The third electrode 148 is fixed with respect to the diaphragm 102, and the third electrode 148 and the deflectable diaphragm form a third variable capacitor. The third electrode 148 is directly connected to lead wire 108 that is imbedded in the insulator 120 and extends through ceramic plug 115 in opening 113.

A fourth electrode 150 is coupled to the second interior wall 128 within the second interior cavity 134 in the edge region 138 of the second interior wall 128. One method of coupling the fourth electrode 150 is through sputtering. The thickness of the electrode is exaggerated in the Figures for clarity. The fourth electrode 150 is opposite the second interior cavity 134 from the diaphragm 102, is similar in size and shape to the second electrode 146, and is positioned opposite the interior cavity 100 from the second electrode 146. The electrodes 148, 150 are spaced-apart across the insulator 120 from each other and the diaphragm 102, so that the electrodes 148, 150 do not directly contact each other or the diaphragm 102. The fourth electrode 150 is directly connected to lead wire 110, which is spaced-apart from and not in direct contact with lead wire 108, and also extends through ceramic plug 115 in opening 113. Alternatively, the fourth electrode 150 can be merely the end of lead wire 110 exposed to cavity 128.

The third and fourth electrodes 148 and 150 each serve as capacitor plates for separate capacitors. The third electrode 148 is capacitively coupled to the diaphragm 102 to form a third variable capacitor, and the fourth electrode 150 is capacitively coupled to the diaphragm 102 to form a fourth variable capacitor. The third and fourth capacitors are formed in a manner similar to the first and second capacitors, but on the second half-cell 118. A lack of symmetry between the electrodes 144, 146 on the first interior wall 126 and the electrodes 148, 150 on the second interior wall 128 is also contemplated. The example of FIG. 10 does not include a fourth electrode and corresponding lead wire, and thus does not include a fourth capacitor. In the example, the third electrode 148 is opposite the first electrode 144, although the third electrode in this configuration can be placed anywhere on the second interior wall 128.

FIG. 4 shows lead wires 104, 106, 108, 110 connected to the electronics board 112, and FIG. 3 indicates that the sensor 56 is operably coupled to an analog to digital converter 62, such as a capacitance-to-digital converter. The analog to digital converter 62 is connected to other electronics within the transmitter 36, or "transmitter electronics," as described above with reference to FIGS. 2 and 3. Various analog to digital converters are known that convert an analog input to a digital output and are acceptable for use with the process pressure transmitter 36. One type of analog to digital converter 62 is a sigma delta, or known by its symbol ΣΔ. One feature that distinguishes a sigma delta circuit from other types of analog to digital converters is that the sigma delta converter provides a balancing current with a polarity controlled by a clocked controller coupling to an integrator. The analog to digital converter 62 includes a sigma delta circuit and can be implemented as an application specific integrated circuit. In one example, the application specific integrated circuit is on the sensor electronics board 112 and proximate the sensor 56. The application specific integrated circuit, however, can be disposed within the explosion proof housing of the transmitter 36. The application specific integrated circuit can include other circuit elements, as needed or desired, to provide additional functions in addition to that of the sigma delta circuit. One such function can be to determine the capacitance of the sensor capacitors and provide an output that is a function of the process pressure.

FIGS. 11–14 show a few examples of the sensor 56 connected to the analog to digital converter 62. In each of the illustrated examples, the lead wires 104, 106, 108, 110, and thus the electrodes 144, 146, 148, 150, are electrically coupled to the analog to digital converter 62, implemented as an application specific integrated circuit 151 in FIG. 11 and as 152 in FIGS. 12–14, which provide output 148. Circuit 151 of FIG. 11 includes circuit 152 and additional circuit elements or electrical connections. Application specific integrated circuit 152 is known in the art and can be used with related art sensors. Circuit 152 is used in the Model 3051C Process Pressure Transmitter manufactured and sold by Rosemount Inc., of Eden Prairie, Minn. Circuit 152 in FIGS. 12–14 includes a sensor excitation output 155 electrically coupled to the diaphragm 102 to electrically charge the diaphragm and generate an electric field within the interior cavity 100. The circuit 152 also includes a capacitance high input 153, a capacitance low input 154, which are electrically coupled to the electrodes 144–150, and a linearization capacitor excitation terminal 156.

Figure 12:
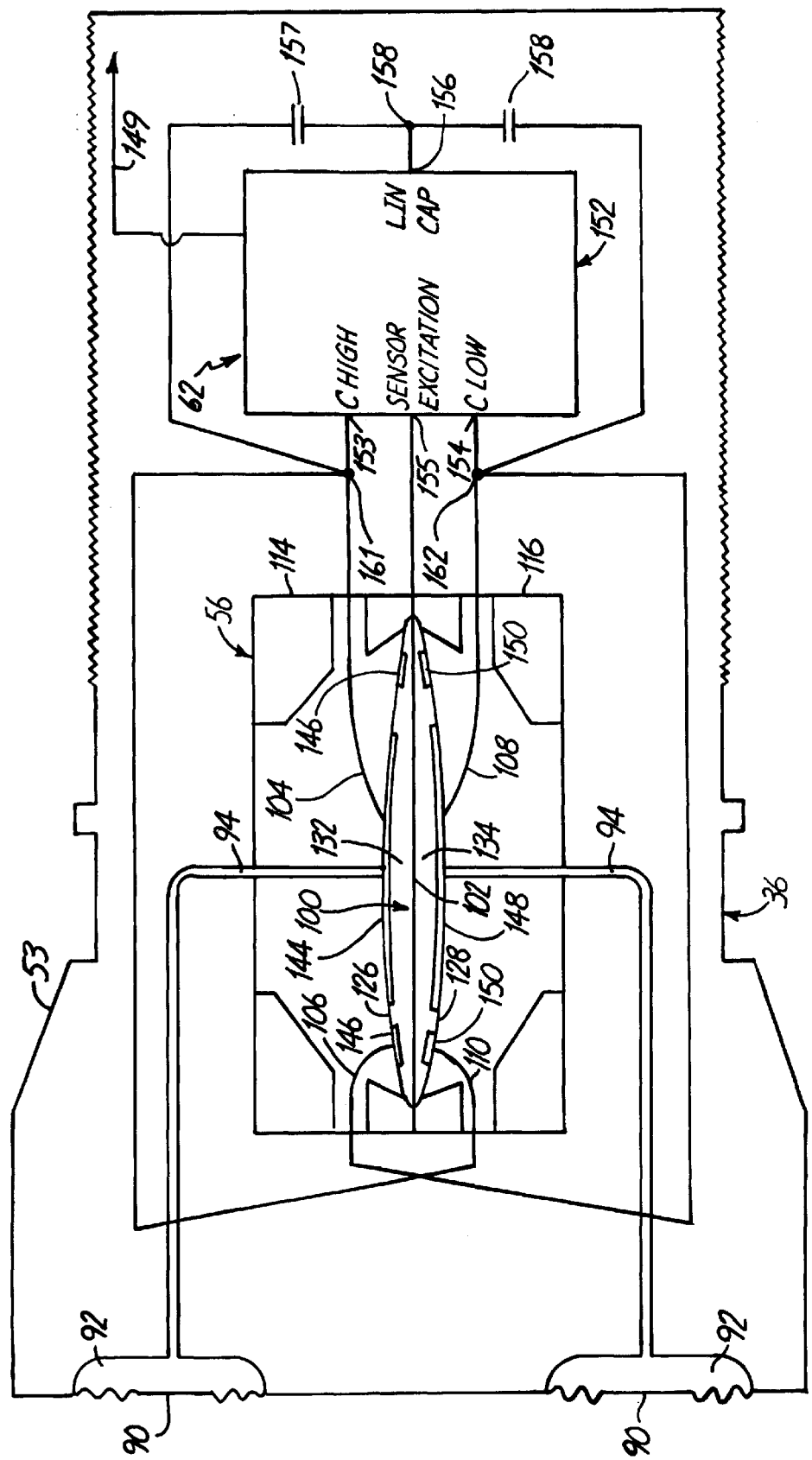
Figure 13:
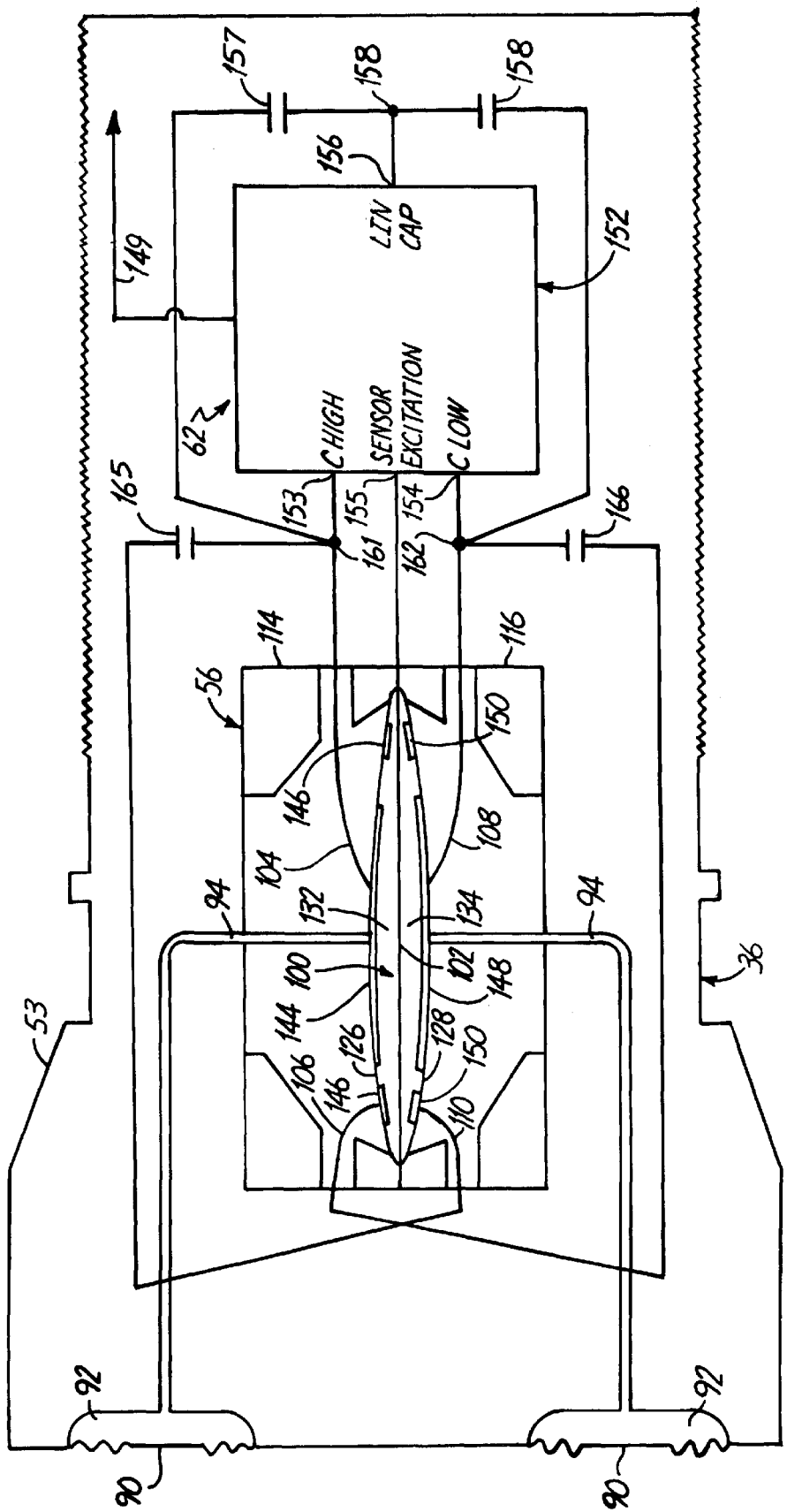

FIGS. 12 and 13 show the first and fourth electrodes 144, 150 electrically coupled together outside of the interior cavity 100 at a first node 161, and the second and third electrodes 146, 148 are electrically coupled together outside of the interior cavity 100 at a second node 162. The first and second nodes 161, 162 are electrically coupled to circuit 152. Specifically, the first node 161 is electrically connected directly to the capacitance high input 153 and the second node is electrically connected directly to the capacitance low input 154. Linearization capacitors 157, 158 are connected between nodes 161, 162, respectively, and node 159, which is provided to terminal 156. FIG. 12 shows lead wires 104 and 110 bonded together to form node 161, and lead wires 106, 108 bonded together to form node 162. In FIG. 13, a first adjustment capacitor 165 is electrically connected between the fourth electrode 150 and the first node 161. Also, a second adjustment capacitor 167 is electrically connected between the second electrode 146 and the second node 162.

Figure 14:
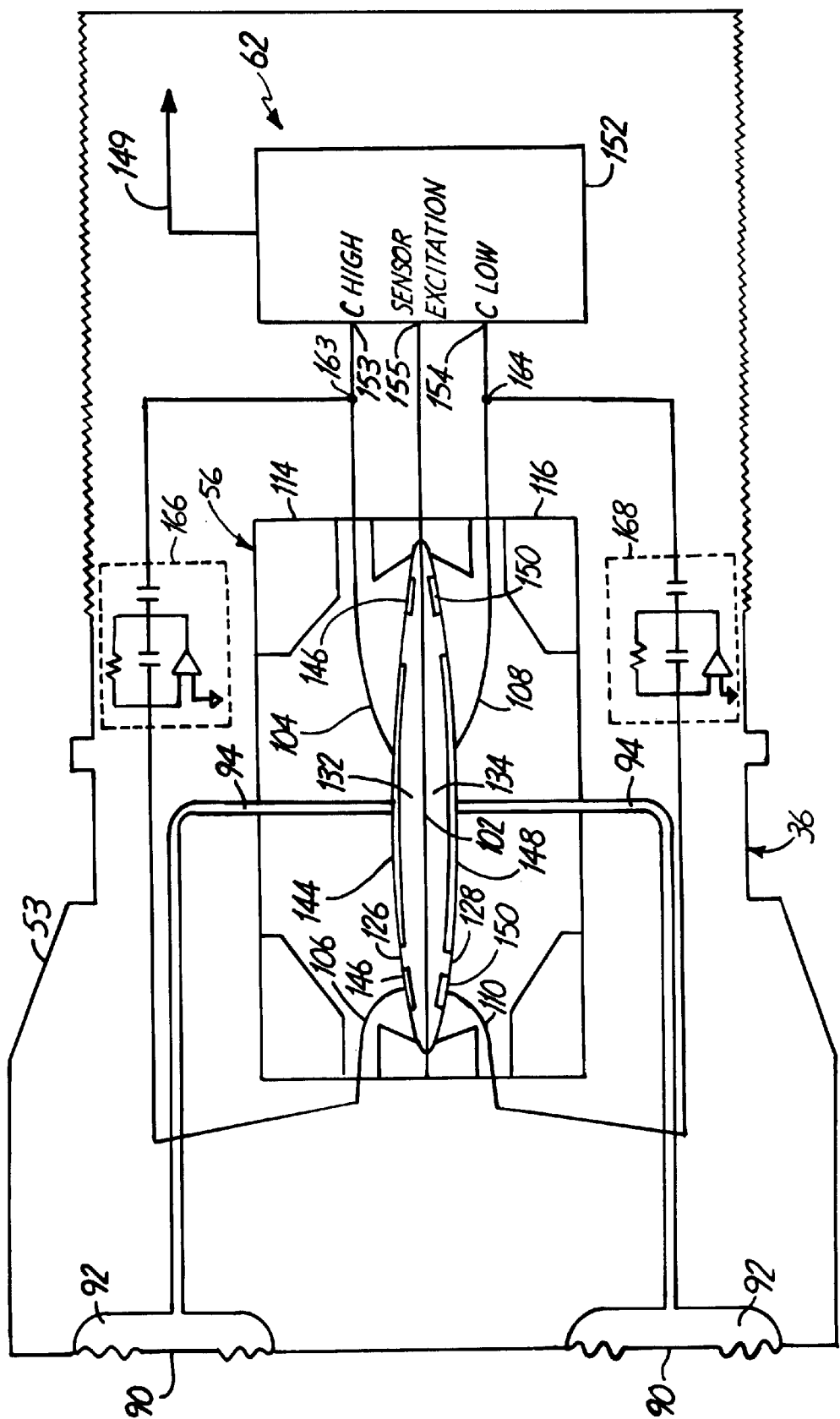

FIG. 14 shows the first and second electrodes 144, 146 electrically coupled together outside of the interior cavity 100 at a third node 163, and the third and fourth electrodes 148, 150 electrically coupled together outside of the interior cavity 100 at a fourth node 164. A first inverting charge amplifier 166 is electrically connected to the second electrode 146 and its output provided to the third node 163. A second inverting charge amplifier 168 is electrically connected to the fourth electrode 150 and its output provided to the fourth node 164. Inverting charge amplifiers are known in the art, and are generally defined by their function of amplifying and reversing the polarity of a charge signal. The third node and fourth nodes 163, 164 are electrically coupled directly to the capacitance high and low inputs 153, 154, respectively.

Figure 11:
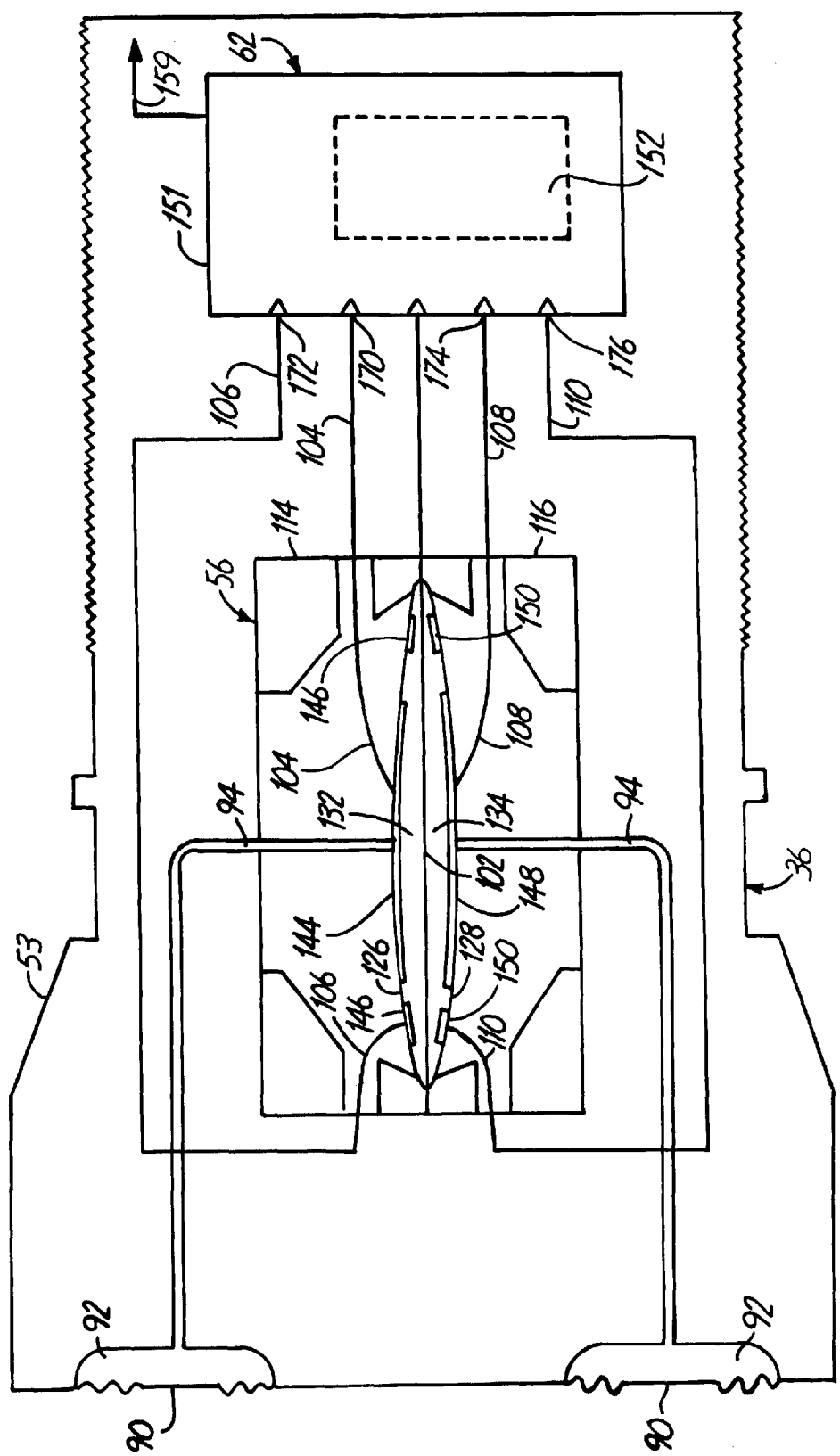
FIGS. 11–15 show schematic views of transmitter configurations constructed in accordance with the present invention and implementing the pressure sensor FIG. 4.

FIGS. 12–14 show that the circuit elements and nodes outside of the sensor are also separate from the application specific integrated circuit 152. These circuit elements can be located on the sensor electronics board 112 and then connected to circuit 152 also on board 112. FIG. 11 shows an example where an application specific integrated circuit 151 includes the circuit 152 and additional circuit elements in monolithic form such that any of the embodiments shown in FIGS. 12–14 can be implemented as one microelectronic chip. Circuit 151 can also include other circuit elements as is apt for a particular application. Lead wires 104, 106, 108, 110 are directly connected to the inputs 170, 172, 174, and 176 of circuit 151. Circuit 151 includes the nodes and capacitors shown in FIGS. 12 and 13, respectively, or the nodes and inverting charge amplifier shown in FIG. 14.

Figure 15:
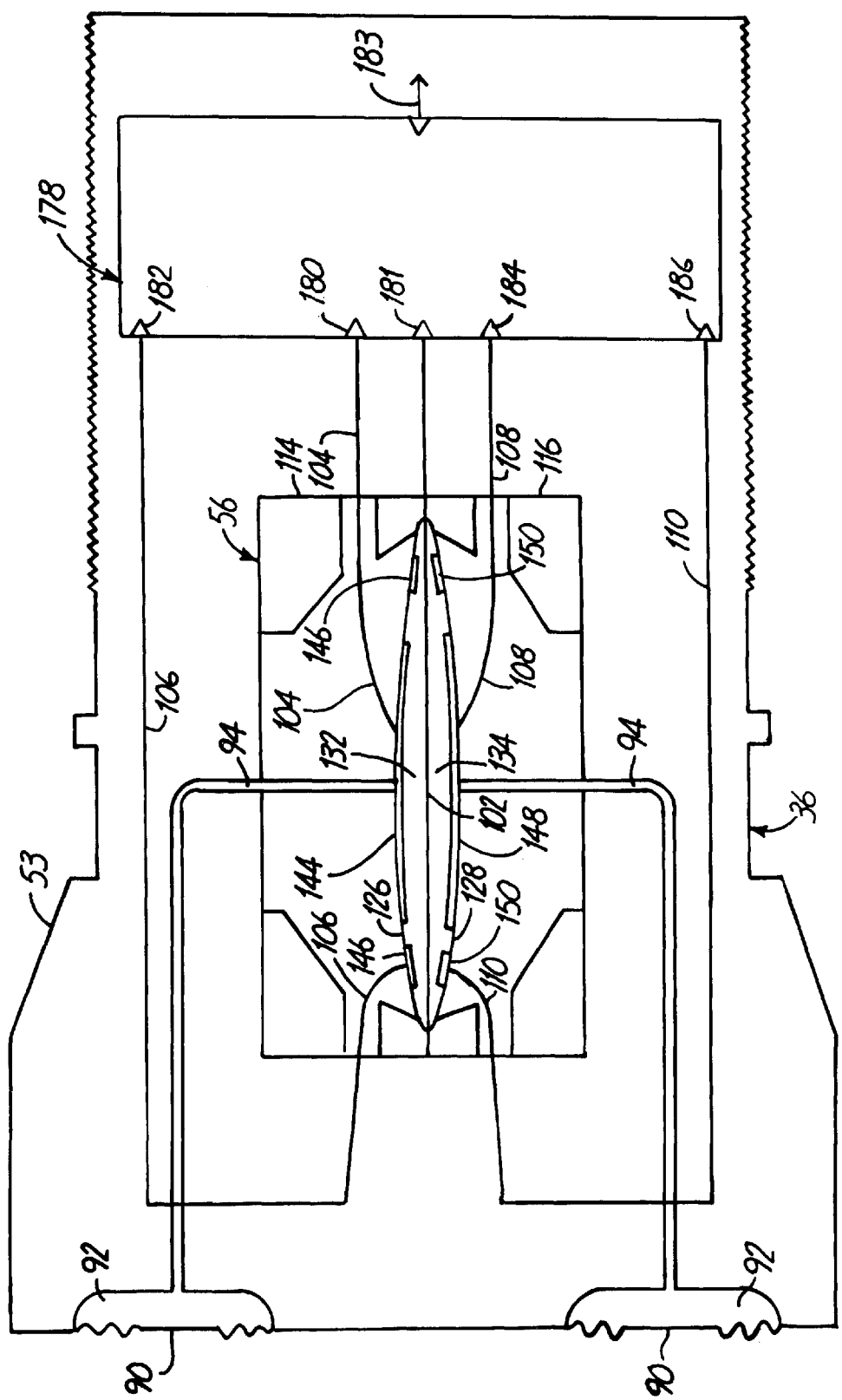

FIG. 15 shows lead wires 104, 106, 108, 110 of sensor connected to application specific integrated circuit 178 at inputs 180, 182, 184, 186. Circuit 178 also includes sensor excitation output 181 and circuit output 183, analogous to that of circuits 151 and 152. Circuit 178 is unlike circuit 151 in that circuit 178 uses a particular sigma delta converter other than that indicated as circuit 152.

Figure 16:
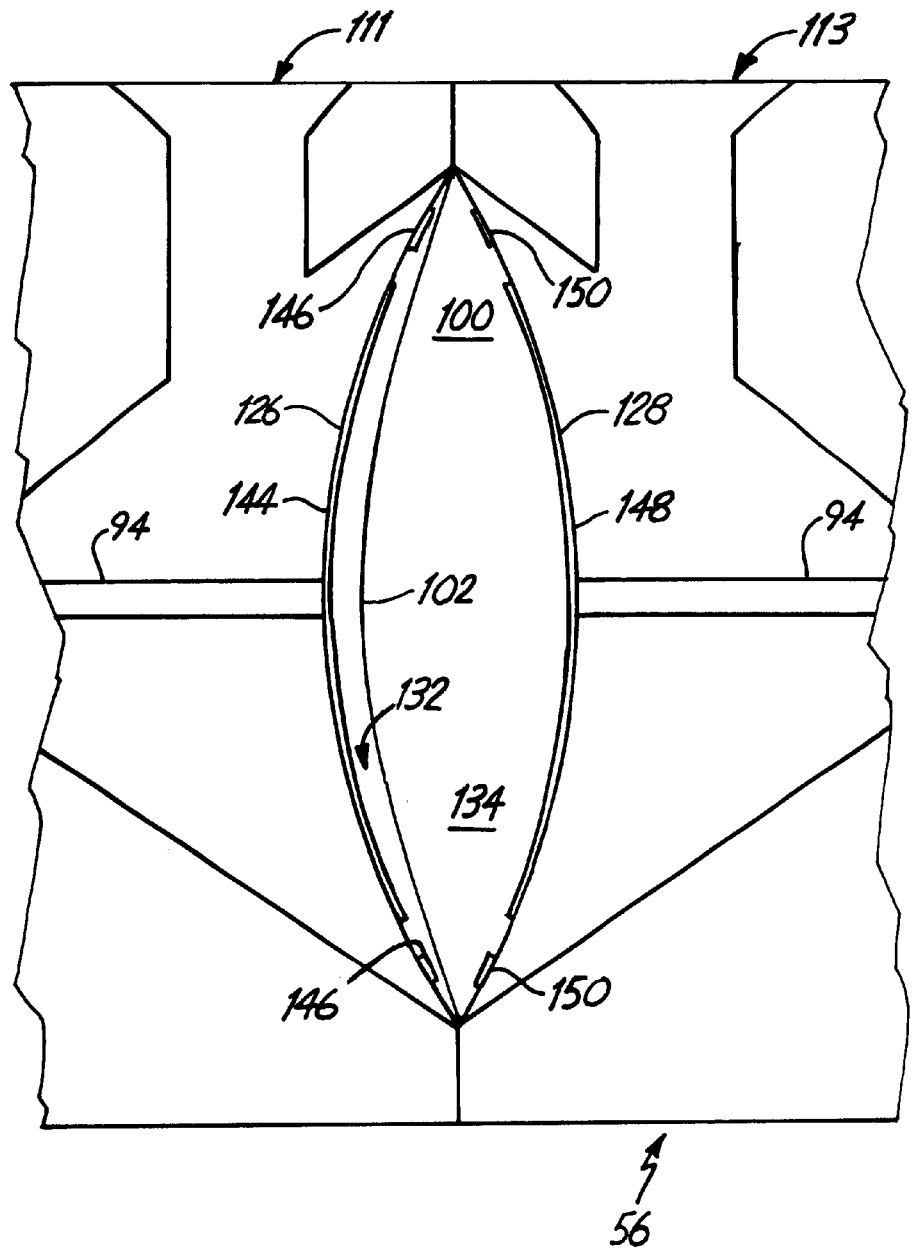
FIGS. 16–18 show schematic views of the pressure sensor of FIG. 4 in operation.

The diaphragm 102 is shown as straight and flat in FIG. 5 as indicative of equal pressures applied in the first and second cavities 132, 134. When a pressure difference exists between the cavities 132, 134, such as when the pressure in cavity 134 is greater than the pressure in cavity 132, the diaphragm deflects from its original position as suggested in FIG. 16. The thickness of the electrode is exaggerated in the Figures for clarity. Ideally, the shape of a deflected diaphragm 102 is parabolic, as shown in FIG. 16. The ideal parabolic shape of the deflected diaphragm generally matches the spherical contour of the first interior wall 126 (similarly, if the pressures were reversed, the shape of the deflected diaphragm would generally match the contour of the second interior wall 128). Ideal deflection of the diaphragm as a percentage of the contour of the first interior wall is generally the same at all locations of the diaphragm. The percentage change in the variable capacitance also is the same as the diaphragm is urged toward the first interior wall 126 in this example. Accordingly, the first and second capacitors should measure the same ratiometric changes in capacitance as the diaphragm is urged toward the first interior wall 126, and this capacitance is related to the applied process pressure.

Figure 17:
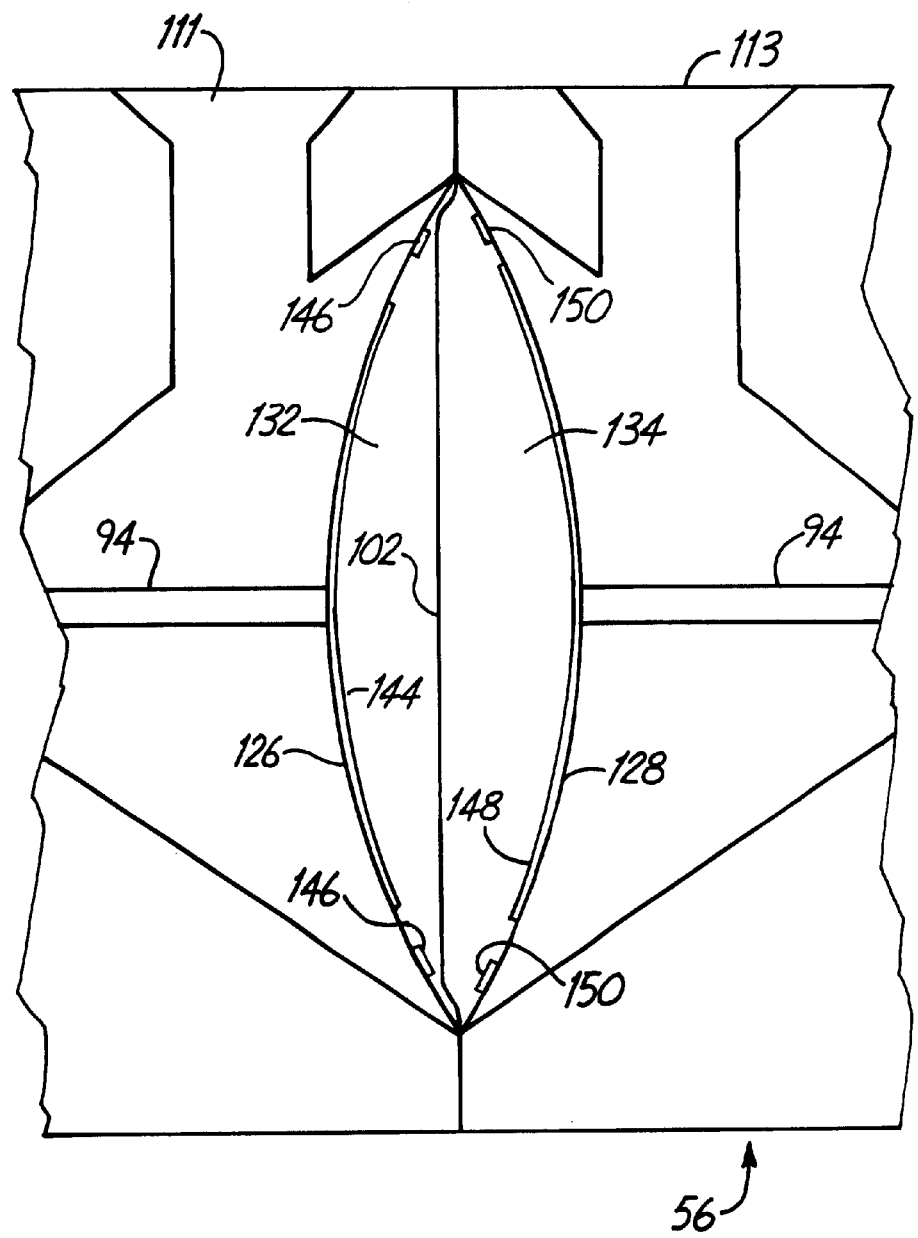
Figure 18:
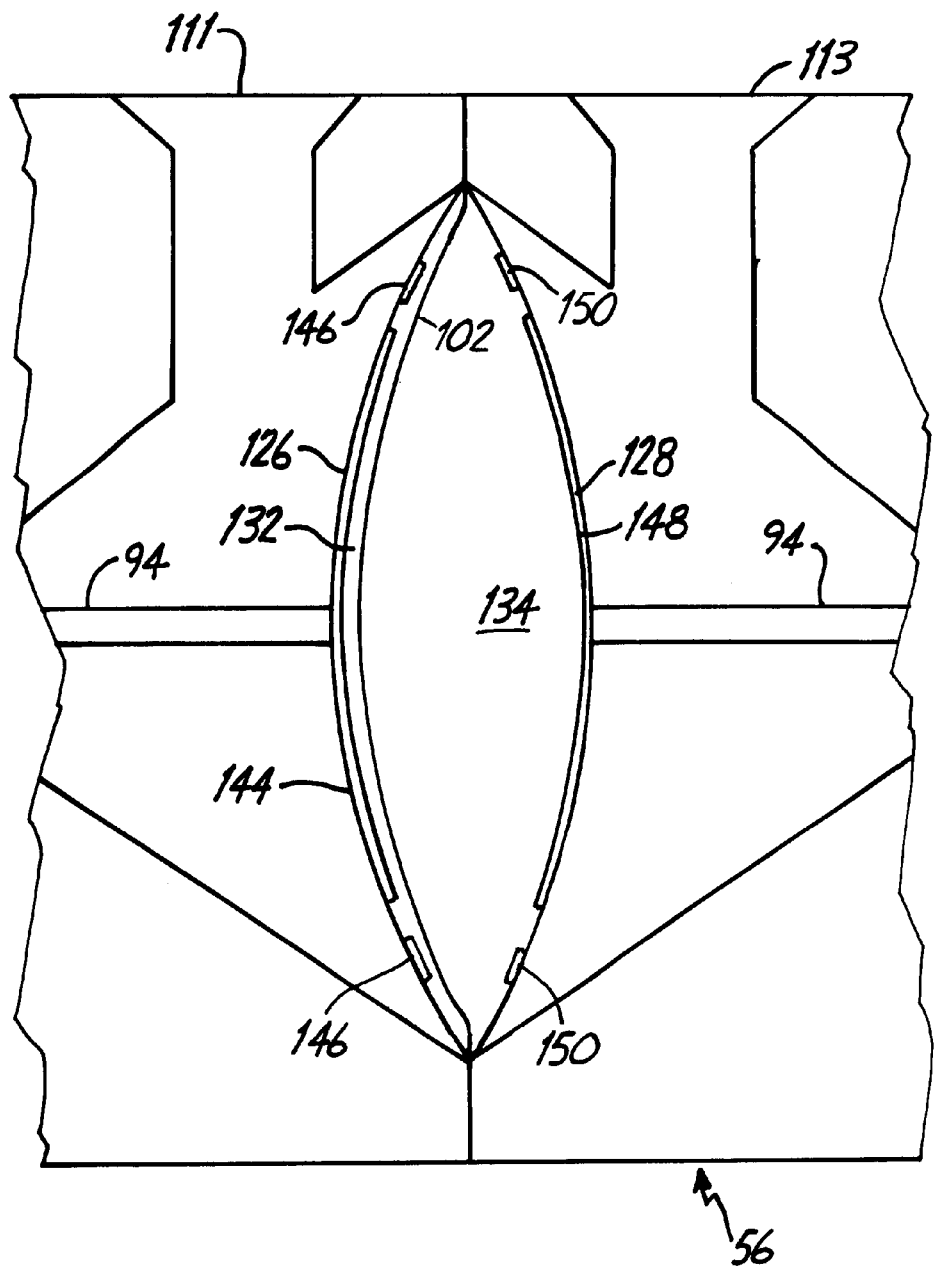

The diaphragm 102, however, does not deflect in such an ideal parabolic manner. Instead, the diaphragm 102 becomes offset but flat after it is initially deflected. For example, FIG. 17 shows diaphragm deformation when the pressures in both cavities 132, 134 are equal. The diaphragm 102 extends into one cavity or the other when ideally it should be flat throughout. The amount of offset shown in FIGS. 17 and 18 are merely illustrative and exaggerate the actual amount of deformation. In general, this offset is caused by edge-bending moments originating at the region 152 where the diaphragm 102 physically contacts the first and second interior walls 126, 128. The edge-bending moments include edge frictional moments and yielding or creeping moments. The amount of bending along the diaphragm is also exaggerated for clarity. For example, all of the electrodes 144, 146, 148, 150 in an actual sensor 96 are typically opposite the flat portion of the offset diaphragm 102. FIG. 18 shows diaphragm deformation when the pressure in cavity 134 is greater than the pressure in cavity 132. The diaphragm 102 deflects in a parabolic manner, but deflects from the offset state and thus includes an offset component. The amount of diaphragm deflection becomes the parabolic deflection as a result of the differential pressure added to the amount of diaphragm offset as a result of the edge-bending moments.

Figure 19:
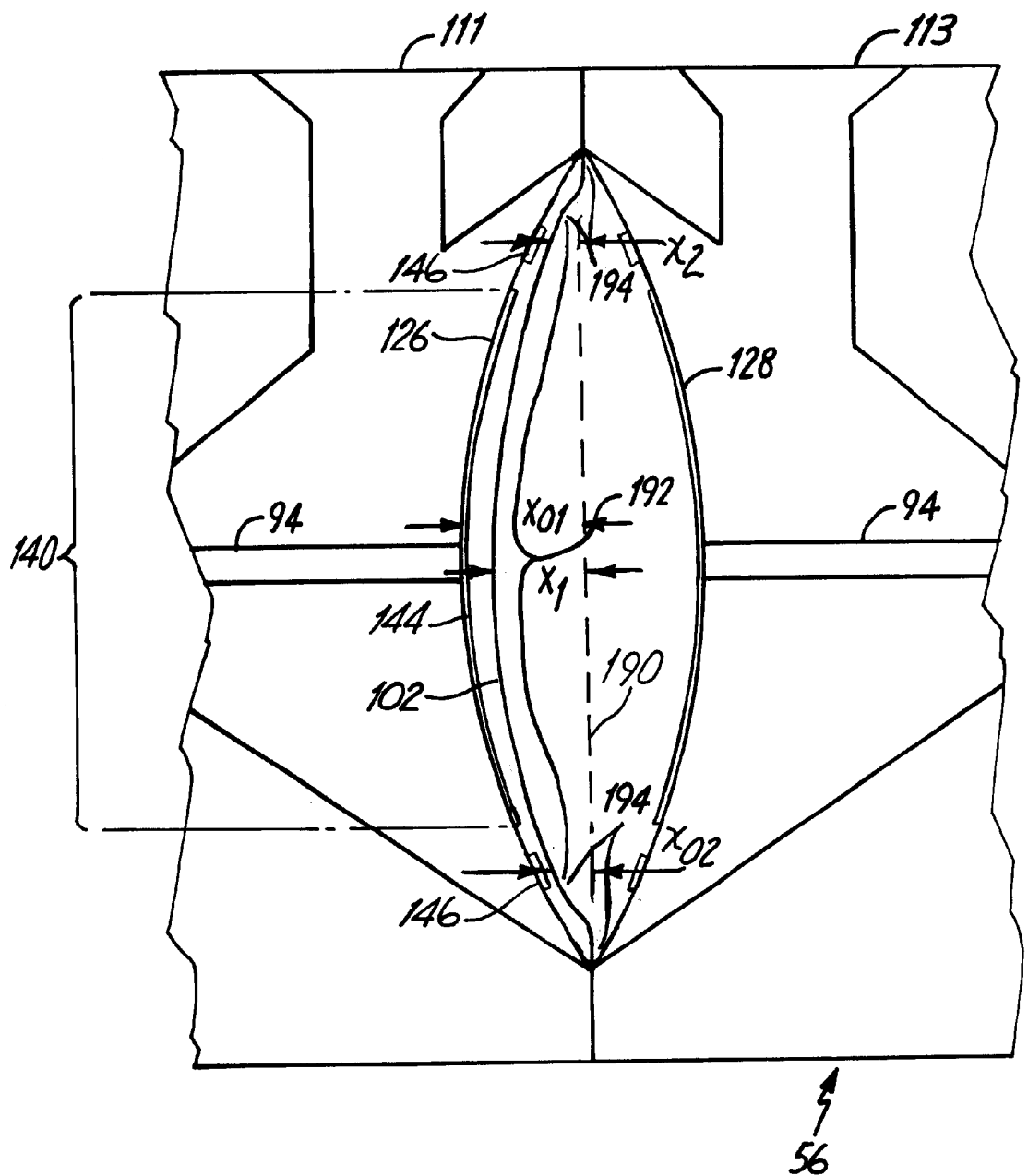
FIG. 19 is a simplified schematic view of the pressure sensor of FIG. 4.

The process of error compensation is introduced with reference to FIG. 19, which is a simplified schematic diagram of the sensor 56. Error compensation begins with the measurement of two distances of diaphragm deflection from a selected position, or reference plane, and subtracting one distance from the other to arrive at a value proportional to an error corrected output. For example, the selected position can be a reference plane 190 representative of an ideal diaphragm at rest. In this example, the diaphragm includes a center region 192 generally opposite the center region 140 of the first interior wall 126, and an edge region 194 generally opposite the edge region 136 of the first interior wall 126. The first distance $X_1$ is the distance of the diaphragm center region 192 to plane 190. The second distance $X_2$ is the distance of the diaphragm edge region 194 to the plane 190. The second distance $X_2$ is subtracted from the first distance $X_1$ to provide a value proportional to an error corrected output of a differential pressure measurement, or R. Specifically, $R=(K(X_1-X_2))$.

The value K can be unity or some other constant. The value K is typically used to scale output and is often equal to or between (−1) and (1). In one example, K is equal to the inverse of the value resulting from the distance $X_{O1}$ of the interior wall center region 140 to the plane 190 added to the distance $X_{O2}$ of the interior wall edge region 136 to the plane 190. Specifically, $K=1/(X_{O1}+X_{O2})$. In implementation of the sensor 96, $X_{O1}$ is obtained by measuring the distance between the center electrodes 144, 148 and dividing by two. In implementation of the sensor 96, $X_{O2}$ is obtained by measuring the distance between the edge electrodes 146, 150 and dividing by two. Accordingly, $$R=(X_1-X_2)/(X_{O1}+X_{O2})$$

If the interior wall is curved, $X_{O1}$ does not equal $X_{O2}$. This transfer function can be implemented in a variety of sensors having a dielectric fill-fluid in order to compensate for diaphragm deformation and changes in the dielectric constant of the fill-fluid. A sensor that lends itself to the implementation of this transfer function is the four-electrode sensor of FIG. 5. In a transfer function implemented by the three-electrode sensor of FIG. 10, there is no value $X_{O2}$. Thus, $K=1/X_{O1}$. Accordingly, $$R=(X_1-X_2)/X_{O1}$$

The calculations and output can be provided by any one of a variety of signal processing devices in addition to the application specific integrated circuits described above.

A basic form of a transfer function used with the transmitter of FIG. 2 to provide an error compensated output in the measurement of process pressure makes use of four capacitance measurements provided by the sensor 56. The capacitance of the first capacitor is related to an electrical signal at the first electrode 144 and is described as the first capacitance, or $C_1$. The capacitance of the second capacitor is related to an electrical signal at the second electrode 146 and is described as the second capacitance, or $C_2$. The capacitance of the third capacitor is related to an electrical signal at the third electrode 148 and is described as the third capacitance, or $C_3$. The capacitance of the fourth capacitor is related to an electrical signal at the fourth electrode 150 and is described as the fourth capacitance, or $C_4$.

The output R of the basic transfer function is indicative of a differential pressure measurement compensated for diaphragm deformation. One expression of the basic transfer function is shown in equation A:

$$R=((C_1-C_3)-(C_2-C_4))/((C_1+C_3)-(C_2+C_4))$$ [A]

In equation A, the fourth capacitance $C_4$ is subtracted from the second capacitance $C_2$ to obtain a first difference ($C_2-C_4$). The third capacitance $C_3$ is subtracted from the first capacitance $C_1$ to obtain a second difference ($C_1-C_3$). The first difference is subtracted from the second difference to obtain a numerator. The denominator includes a first sum of the second and fourth capacitances ($C_2+C_4$) subtracted from a second sum of the first and third capacitances ($C_1+C_3$). The numerator is divided by the denominator to obtain output R. These steps can be performed in another order or several steps can be performed simultaneously.

The basic transfer function of equation A is related to error compensation based on distance of deflection, described above with reference to FIG. 19. The ratio of the capacitance of the edge electrode to the capacitance of the center electrode is selected to improve performance of the sensor. For example, if $X_{O1}/X_{O2}=(C_2+C_4)/(C_1+C_3)$, or $C_2/C_1=C_4/C_3=X_{O1}/X_{O2}$, then $R=(X_1-X_2)/(X_{O1}+X_{O2})$. In practice, this suggests that the size of the electrodes in the edge region, i.e. electrodes 146, 150, be quite small, or thin in the case of a ring or partial ring configuration. Another way to accomplish this result is if some or all of the four capacitances related to the respective electrical signals are amplified, attenuated, or a combination of both before the transfer function is used to operate on the capacitances. Attenuation is also amplification; specifically, it is amplification by a gain of less than unity. Thus, the "raw" electrical signals actually present at the electrodes 144, 146, 148, 150 each can be multiplied by a selected gain to provide electrical signals representative of the four capacitances suitable for implementation of the transfer functions. In the sensor of FIG. 5, the raw electrical signals from electrodes 146 and 150 are amplified by a gain of less than unity to provide signals used in the transfer function.

FIG. 14 shows one implementation of the basic transfer function. Circuit 152 receives two inputs representative of capacitances at the capacitance high and low inputs 153, 154, which are abbreviated as $C_H$ and $C_L$. Circuit 152 receives the inputs and provides an output $R_1$ as expressed in Equation B:

$$R_1=(C_L-C_H)/(C_H+C_L)$$ [B]

The input 153 receives a signal $C_L$ which is equal to $(C_1-C_2)$; and input 154 receives a signal $C_H$ which is equal to $(C_3-C_4)$. Accordingly, the output of circuit 152 is expressed as Equation C:

$$R_1=((C_1-C_2)-(C_3-C_4))/((C_1-C_2)+(C_3-C_4))$$ [C]

Often, stray capacitances are introduced into the capacitance measurements of the sensor 96. As a result, each capacitance term in Equation A can include a main capacitance term representative of the capacitance between the electrode and the diaphragm 102, and a stray capacitance. For example, the first capacitance can include a first main capacitance and a first stray capacitance such that $C_1=(C_{1M}+C_{1S})$. Similarly, $C_2=(C_{2M}+C_{2S})$, $C_3=(C_{3M}+C_{3S})$, and $C_4=(C_{4M}+C_{4S})$.

The implementation of FIG. 14 contemplates the effect of stray capacitances. When the gains on inverting charge amplifiers 166, 168 are set to (−1), the transfer function of the implementation is independent of stray capacitance if $C_{1S}=C_{2S}=C_{3S}=C_{4S}$. In general, however, the first inverting charge amplifier 166 inverts the polarity of C2 and multiplies the result by a gain $A_1$, and the second inverting charge amplifier 168 inverts the polarity of $C_4$ and multiplies the result by a gain $A_2$. Thus, an expression of the output of the configuration of FIG. 14, consistent with the basic transfer function, is $$R_1 = \frac{((C_{1M}+C_{1S})-A_1(C_{2M}+C_{2S}))-((C_{3M}+C_{3S})-A_2(C_{4M}+C_{4S}))}{((C_{1M}+C_{1S})-A_1(C_{2M}+C_{2S}))+((C_{3M}+C_{3S})-A_2(C_{4M}+C_{4S}))}$$

The desired compensation can be accomplished by adjusting the gains $A_1$ and $A_2$. The effect of stray capacitance can be reduced by an optimum design of a sensor, and gains $A_1$ and $A_2$ can be adjusted independently of each other to compensate for any lack of physical symmetry.

FIGS. 12 and 13 show two examples of another implementation of the basic transfer function. An expression of the basic transfer function is shown as Equation D:

$$R=((C_1+C_4)-(C_2+C_3))/((C_1+C_4)+(C_2+C_3))$$ [D]

Equation E is consistent with the expression of Equation A. In Equation D, the first capacitance $C_1$ is added to the fourth capacitance $C_4$ to obtain a first sum $(C_1+C_4)$. The second capacitance $C_2$ is added to the third capacitance $C_3$ to obtain a second sum $(C_2+C_3)$. The first sum is added to the second sum to obtain the denominator, and the second sum is subtracted from the first sum to obtain the numerator. The numerator is divided by the denominator to obtain the output R.

Additional capacitance values are included in implementation of the transfer function for the example of FIG. 12. The implementation also is susceptible to the effects of stray capacitance. In one design of the sensor, the four stray capacitances are equal to each other. In another design, the stray capacitances are effectively eliminated. The example also includes two linearization capacitors 157, 158, which introduce linearization capacitances $C_{L1}$ and $C_{L2}$, respectively, that effect the transfer function. Thus, an expression of the output $R_2$ of the configuration of FIG. 12 taking into account the linearization capacitances and stray capacitances is:

$$R_2 = \frac{((C_{1M}+C_{1S})+(C_{4M}+C_{4S})-C_{LI})-((C_{2M}+C_{2S})+(C_{3M}+C_{3S})-C_{L2})}{((C_{1M}+C_{1S})+(C_{4M}+C_{4S})-C_{LI})+((C_{2M}+C_{2S})+(C_{3M}+C_{3S})-C_{L2})}$$

The step of adding the first capacitance $C_1$ to the fourth capacitance $C_4$ in Equation D includes subtracting a first linearization capacitance CLI related to an electrical signal at a first linearization capacitor 157 from the first or fourth capacitance to obtain the first sum. Also, the step of adding the third capacitance $C_3$ to the second capacitance $C_2$ in Equation D includes subtracting a second linearization capacitance $C_{L2}$ related to an electrical signal at a second linearization capacitor 158 from the second or third capacitance to obtain the second sum.

Still additional capacitance values are included in the implementation of the transfer function for the example of FIG. 13. The example includes two adjustment capacitors 165, 167, which introduce adjustment capacitances $C_{A1}$ and $C_{A2}$, respectively, that effect the transfer function. Thus, an expression of the output $R_3$ of the configuration is shown in Equation E:

$$R_3 = \frac{((C_{1M}+C_{1S})+(C_{4E})-C_{LI})-((C_{2E})+(C_{3M}+C_{3S})-C_{L2})}{((C_{1M}+C_{1S})+(C_{4E})-C_{LI})+((C_{2E})+(C_{3M}+C_{3S})-C_{L2})} \quad [E]$$

The second capacitance $C_2$ of Equation D becomes a second effective capacitance $C_{2E}$ in Equation E, and is expressed as:

$C_{2E}=C_{2A}(C_{2M}+C_{2S})/(C_{A2}+C_{2M}+C_{2S})$

The second effective capacitance $C_{2E}$ includes the second adjustment capacitance $C_{A2}$ multiplied by the sum of the second main capacitance $C_{2M}$ and second stray capacitance $C_{2S}$ and divided by the sum of the second adjustment capacitance $C_{A2}$, second main capacitance $C_{2M}$ and second stray capacitance $C_{2S}$.

The fourth capacitance $C_4$ of Equation D becomes a fourth effective capacitance $(C_{4E})$ in Equation E, and is expressed as:

$C_{4E}=C_{A1}(C_{4M}+C_{4S})/(C_{A1}+C_{4M}+C_{4S})$

The fourth effective capacitance $C_{4E}$ includes the first adjustment capacitance $C_{A1}$ multiplied by the sum of the fourth main capacitance $C_{4M}$ and fourth stray capacitance $C_{4S}$ and divided by the sum of the first adjustment capacitance $C_{A1}$, fourth main capacitance $C_{4M}$ and fourth stray capacitance $C_{4S}$.

Equation A can be implemented in many forms. For example, circuit 178 of FIG. 15 receives electrical signals related to the four capacitances from lead wires 104, 106, 108, 110. Circuit 178 then processes the signals to generate an output consistent with the basic transfer function set forth in Equation A.

Figure 10:
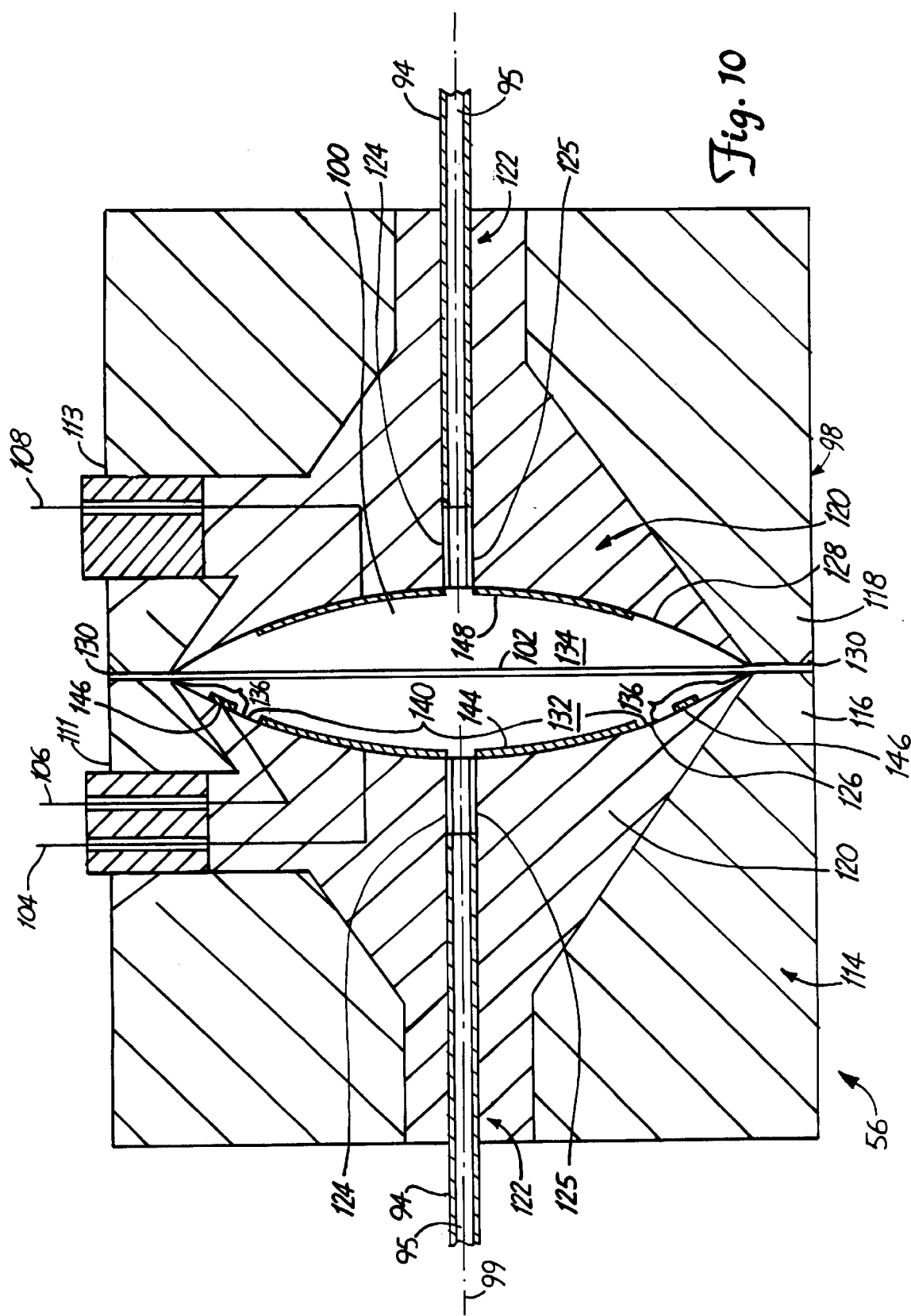
FIG. 10 shows a side-sectioned view of another pressure sensor constructed in accordance with the present invention.

The equation $R=(X_1-X_2)/X_{01}$, described above, can be implemented with a sensor having three capacitors, similar to the sensor of FIG. 10. The capacitance of the first capacitor is related to an electrical signal at the first electrode 144 and is described as the first capacitance, or $C_1$. The capacitance of the second capacitor is related to an electrical signal at the second electrode 146 and is described as the second capacitance, or $C_2$. The capacitance of the third capacitor is related to an electrical signal at the third electrode 148 and is described as the third capacitance, or $C_3$.

The output R of the transfer function using this sensor is:

$$R = \frac{C_1 - C_3 - AC_1C_3/C_2}{C_1 + C_3 + B}$$

In this equation, the first capacitance $C_1$ is multiplied by the third capacitance $C_3$ and by a first constant A to obtain a first value $(AC_1C_3)$. The first value is divided by the second capacitance $C_2$ obtain a second value $(AC_1C_3/C_2)$. The second value is subtracted from the third capacitance $C_3$ to obtain a fourth value, which is subtracted from the first capacitance $C_1$ to obtain a numerator. The numerator is divided by the sum of the first capacitance $C_1$, third capacitance $C_3$ and a second constant B. The constants A and B are chosen so that $R=(X_1-X_2)/X_{01}$.

What is claimed is:

1. A pressure sensor, the pressure sensor comprising:
   a cell body having a first interior wall and a second interior wall generally opposite the first interior wall, the first and second interior walls defining an interior cavity;
   a deflectable diaphragm having a conductive portion, the diaphragm coupled to the cell body between the first and second interior walls, the diaphragm separating the interior cavity into a first cavity and a second cavity, wherein the first cavity is defined by the first interior wall and the diaphragm, and the second cavity is generally opposite the first cavity and defined by the second interior wall and the diaphragm,
   wherein the first and second cavities each contain a dielectric fill-fluid, the fill fluids each adapted to receive a pressure and exert a corresponding force on the diaphragm, and the diaphragm is deflectable in response to differences in the pressures received by the fill-fluids in the first and second cavities, and
   wherein the first interior wall includes an edge region and a center region, the edge region surrounding the center region;
   a first electrode coupled to the first interior wall generally within the center region and within the first cavity, the first electrode generally opposite the conductive portion of the diaphragm and capacitively coupled to the conductive portion to form a first variable capacitor;
   a second electrode coupled to the first interior wall generally within the edge region, the second electrode generally opposite the conductive portion of the diaphragm and capacitively coupled to the conductive portion to form a second variable capacitor; and a third electrode coupled to the second interior wall, the third electrode capacitively coupled to the conductive portion of the diaphragm to form a third variable capacitor.

2. The pressure sensor of claim 1 wherein the cell body is formed of a first cell half having the first interior wall and a second cell half having the second interior wall, and wherein the diaphragm is stretched between the two cell halves.

3. The pressure sensor of claim 2 wherein the diaphragm is in contact with the cell body and adjacent to the first and second interior walls.

4. The pressure sensor of claim 2 wherein a portion of the first and second interior walls are formed of an insulator material.

5. The pressure sensor of claim 4 wherein the electrodes are sputtered on the insulator material of the first and second interior walls.

6. The pressure sensor of claim 1 wherein the deflectable diaphragm is a thin metal membrane, and the conductive portion includes the entire diaphragm.

7. The pressure sensor of claim 1 wherein the dielectric fill-fluid is a silicone oil.

8. A pressure sensor, the pressure sensor comprising:
a cell body having a concave first interior wall and a concave second interior wall generally opposite the first interior wall, wherein the first and second interior walls each include an edge region and a center region, the edge region surrounding the center region on each interior wall, the first and second interior walls defining an interior cavity;
a conductive and deflectable diaphragm, the diaphragm coupled to the cell body between the first and second interior walls, the diaphragm separating the interior cavity into a first cavity and a second cavity,
wherein the first cavity is defined by the first interior wall and the diaphragm, and the second cavity is generally opposite from the first cavity and defined by the second interior wall and the diaphragm, and
wherein the first and second cavities each include a dielectric fill-fluid adapted to receive a pressure and exert a force on the diaphragm, and the diaphragm is deflectable in response to differences in the pressures received by the fill-fluids in the first and second cavities;
a first conductive plate attached to the first interior wall generally within the center region, the first conductive plate capacitively coupled to the conductive diaphragm to form a first variable capacitor;
a second conductive plate attached to the first interior wall generally within the edge region, the second conductive plate spaced-apart from the first conductive plate and capacitively coupled to the conductive diaphragm to form a second variable capacitor;
a third conductive plate attached to the second interior wall generally within the center region and opposite the first conductive plate, the third conductive plate capacitively coupled to the conductive diaphragm to form a third variable capacitor; and
a fourth conductive plate attached to the second interior wall generally within the edge region, the fourth conductive plate spaced-apart from the third conductive plate, the fourth conductive plate capacitively coupled to the conductive diaphragm to form a fourth variable capacitor.

9. The pressure sensor of claim 8 wherein the concave first and second interior walls are generally spherical.

10. The pressure sensor of claim 9 wherein the concave interior walls provide an over-pressure stop for the diaphragm deflected under the differences in pressure.

11. The pressure sensor of claim 8 wherein an axis extending perpendicularly from the center of the diaphragm extends through the center regions of the first and second interior walls.

12. The pressure sensor of claim 11 wherein a first distance along the first interior wall from the first electrode to the axis is shorter than a second distance along the interior wall from the second electrode to the axis.

13. The pressure sensor of claim 11 wherein the first electrode is substantially circular and has a center corresponding with the axis on the first interior wall, and the second electrode is at least a partial ring disposed about the first electrode.

14. The pressure sensor of claim 13 wherein the second electrode is a complete ring.

15. The pressure sensor of claim 11 wherein the third electrode is substantially circular and has a center corresponding with the axis on the second interior wall, and the fourth electrode is at least a partial ring disposed about the third electrode.

16. A pressure sensor, the pressure sensor comprising:
a cell body having generally opposite concave first and second interior walls at least partially defining an interior cavity;
a deflectable diaphragm having a conductive portion, the diaphragm attached to the cell body to form a first cavity defined by the first interior wall and the diaphragm, and forming a second cavity defined by the second interior wall and the diaphragm,
wherein the first and second cavities are each adapted to receive a variable pressure that exerts a force on the diaphragm, and the diaphragm is deflectable in response to differences in the pressures received in the first and second cavities;
a first electrode coupled to the first interior wall and capacitively coupled to the conductive portion of the diaphragm to form a first variable capacitor;
a second electrode coupled to the first interior wall and spaced-apart from the first electrode, the second electrode capacitively coupled to the diaphragm to form a second variable capacitor;
a third electrode coupled to the second interior wall and capacitively coupled to the conductive portion of the diaphragm to form a third variable capacitor.

17. A process pressure transmitter, comprising:
a transmitter electronics disposed within a housing, the transmitter electronics including a communications circuit coupled to a processing system;
an analog to digital converter disposed within the housing, the analog to digital converter electrically coupled to the transmitter electronics;
a pressure sensor comprising:
a cell body having a first interior wall and a second interior wall generally opposite the first interior wall, the first and second interior walls defining an interior cavity;
a deflectable diaphragm having a conductive portion, the diaphragm coupled to the cell body between the first and second interior walls, the diaphragm separating the interior cavity into a first cavity and a second cavity, wherein the first cavity is defined by the first interior wall and the diaphragm, and the second cavity is generally opposite the first cavity and defined by the second interior wall and the diaphragm, wherein the first and second cavities each contain a dielectric fill-fluid, each of the fill fluids adapted to receive a pressure and exert a corresponding force on the diaphragm, and the diaphragm is deflectable in response to differences in the pressures received by the fill-fluids in the first and second cavities, and wherein the first interior wall includes an edge region and a center region, the edge region surrounding the center region;

a first electrode coupled to the first interior wall generally within the center region, the first electrode capacitively coupled to the conductive portion to form a first variable capacitor;

a first lead wire electrically connected to the first electrode and extending from the cell body;

a second electrode coupled to the first interior wall generally within the edge region, the second electrode capacitively coupled to the conductive portion to form a second variable capacitor;

a second lead wire electrically connected to the second electrode and extending from the cell body;

a third electrode coupled to the second interior wall generally within the center region of the second interior wall, the third electrode capacitively coupled to the conductive portion of the diaphragm to form a third capacitor;

a third lead wire electrically coupled to the third electrode and extending from the cell body;

a fourth electrode coupled to the second interior wall generally within the edge region of the second interior wall, the fourth electrode electrically coupled to the conductive portion to form a fourth capacitor; and a fourth lead wire electrically coupled to the fourth electrode and extending from the cell body;

wherein the four lead wires are electrically coupled to the analog to digital converter.

18. The pressure transmitter of claim 17 wherein the first and fourth electrodes are electrically coupled together at a first node outside of the cell body, and wherein the second and third electrodes are electrically coupled together at a second node outside of the cell body.

19. The pressure sensor of claim 18 wherein the first and second nodes are electrically coupled to the analog to digital converter.

20. The pressure sensor of claim 18 wherein the first and second nodes are located within the analog to digital converter.

21. The pressure sensor of claim 18 wherein a fifth capacitor is electrically coupled between the fourth electrode and the first node, and a sixth capacitor is electrically coupled between the second electrode and the second node.

22. The pressure transmitter of claim 17 wherein the second electrode is electrically coupled to a first inverting charge amplifier outside of the cell body, the first inverting charge amplifier electrically coupled to the first electrode at a third node, and the fourth electrode is electrically coupled to a second inverting charge amplifier outside of the cell body, the second inverting charge amplifier coupled to the third electrode at a fourth node.

23. The pressure transmitter of claim 22 wherein the third and fourth nodes are electrically coupled to the analog to digital converter.

24. The pressure transmitter of claim 22 wherein the inverting charge amplifiers are located within the analog to digital converter.

25. A method of measuring differential pressure, comprising:

applying a first process pressure to a first amount of fill-fluid on a first side of a deflectable diaphragm;

applying a second process pressure to a second amount of fill-fluid on a second side of the deflectable diaphragm;

measuring an amount of deflection of a center region of the diaphragm from a selected position;

measuring an amount of deflection of an edge region of the diaphragm from the selected position; and subtracting the amount of deflection at the edge region from the amount of deflection at the center region.

26. The method of claim 25 wherein the selected position is a diaphragm-at-rest plane.

27. The method of claim 25 and further including the step of generating an output substantially related to the amount of deflection at the edge region subtracted from the amount of deflection at the center region.

28. The method of claim 25 wherein the diaphragm is opposite a cavity wall having a wall edge region opposite the edge region of the diaphragm and a wall center region opposite the center region of the diaphragm, the method further including:

dividing the amount of deflection at the edge region subtracted from the amount of deflection at the center region by a value equal to a distance of the wall edge region to the selected position added to a distance of the wall center region to the selected position.

29. The method of claim 28 wherein the distance of the edge region of the cavity wall to the selected position is not equal to the distance of the center region of the cavity wall to the selected position.

30. The method of claim 25 wherein the diaphragm is opposite a cavity wall having a wall center region opposite the center region of the diaphragm, the method further including:

dividing the amount of deflection at the edge region subtracted from the amount of deflection at the center region by a value equal to a distance of the wall center region to the selected position.

31. A method of error compensation in measuring differential pressure with a sensor having a conductive and deflectable diaphragm, first and second electrodes on one side of the diaphragm, and third and fourth electrodes on another side of the diaphragm, wherein the four electrodes are each separately coupled to the diaphragm to form four capacitors, the method comprising:

adding a first capacitance signal related to an electrical signal at the first electrode to a fourth capacitance signal related to an electrical signal at the fourth electrode to obtain a first sum;

adding a third capacitance signal related to an electrical signal at the third electrode to a second capacitance signal related to an electrical signal at the second electrode to obtain a second sum;

adding the first sum to the second sum to obtain a denominator;

subtracting the second sum from the first sum to obtain a numerator; and dividing the numerator by the denominator.

32. The method of claim 31 wherein, the first capacitance signal includes a first main capacitance signal and a first stray capacitance signal;

the second capacitance signal includes a second main capacitance signal and a second stray capacitance signal;

the third capacitance signal includes a third main capacitance signal and a third stray capacitance signal; and the fourth capacitance signal includes a fourth main capacitance signal and a fourth stray capacitance signal.

33. The method of claim 32 wherein the first, second, third and fourth electrical signals at the electrodes are multiplied by a gain.

34. The method of claim 33 wherein the first, second, third and fourth stray capacitance signals cancel each other in an output.

35. The method of claim 32 wherein the step of adding the first capacitance signal to the fourth capacitance signal includes subtracting a first linearization capacitance signal related to an electrical signal at a first linearization capacitor from the first or fourth capacitance signals to obtain the first sum; and wherein the step of adding the third capacitance signal to the second capacitance signal includes subtracting a second linearization capacitance signal related to an electrical signal at a second linearization capacitor from the second or third capacitance signals to obtain the second sum.

36. The method of claim 35 wherein the second capacitance signal is a second effective capacitance signal and includes a second adjustment capacitance signal related to an electrical signal at a second adjustment capacitor multiplied by the sum of the second main capacitance signal and second stray capacitance signal and divided by the sum of the second adjustment capacitance signal, second main capacitance signal and second stray capacitance signal; and the fourth capacitance signal is a fourth effective capacitance signal and includes a first adjustment capacitance signal related to an electrical signal at a first adjustment capacitor multiplied by the sum of the fourth main capacitance signal and fourth stray capacitance signal and divided by the sum of the first adjustment capacitance signal, fourth main capacitance signal and fourth stray capacitance signal.

37. The method of claim 31 wherein at least some of the electrical signals at the first, second, third, and fourth electrodes are amplified to provide signals representative of the respective first, second, third, or fourth capacitances signal.

38. The method of claim 37 wherein the electrical signals at the second and fourth electrodes are amplified by a gain of less than unity.

39. A method of error compensation in measuring process pressure with a process measurement transmitter having a sensor generating a plurality of electrical signals representative of a first, second, third and fourth capacitance signals, the method comprising:

subtracting the fourth capacitance signal from the second capacitance signal to obtain a first difference;

subtracting the third capacitance signal from the first capacitance signal to obtain a second difference;

subtracting the first difference from the second difference to obtain a numerator; and dividing the numerator by a denominator, wherein the denominator includes a first sum of the second and fourth capacitance signals subtracted from a second sum of the first and third capacitance signals.

40. The method of claim 39 wherein the first sum is added to the second sum to obtain a third sum, and the denominator includes a fourth sum of linearization capacitances subtracted from the third sum.

41. The method of claim 39 wherein the four capacitance signals each include a main signal and a stray capacitance signal.

42. A method of error compensation in measuring differential pressure with a sensor having a conductive and deflectable diaphragm, first and second electrodes on one side of the diaphragm, and a third electrode on another side of the diaphragm, wherein the three electrodes are each separately coupled to the diaphragm to form three capacitors, the method comprising:

multiplying a first capacitance signal related to a first electrical signal at the first electrode by a third capacitance signal related to a third electrical signal at the third electrode and by a first constant to obtain a first value;

dividing the first value by a second capacitance signal related to a second electrical signal at the second electrode to obtain a second value;

subtracting the second value from the third capacitance signal to obtain a fourth value;

subtracting the fourth value from the first capacitance signal to obtain a numerator; and dividing the numerator by the sum of the first capacitance signal, third capacitance signal and a second constant.

* * * * *

UNITED STATES PATENT AND TRADEMARK OFFICE
CERTIFICATE OF CORRECTION

PATENT NO. : 6,295,875 B1
DATED : October 2, 2001
INVENTOR(S) : Frick et al.

Page 1 of 1

It is certified that error appears in the above-identified patent and that said Letters Patent is hereby corrected as shown below:

Column 14,
Line 50, replace the equation with $$--R_1 = \frac{((C_{1M}+C_{1S})-A_1(C_{2M}+C_{2S}))-((C_{3M}+C_{3S})-A_2(C_{4M}+C_{4S}))}{((C_{1M}+C_{1S})-A_1(C_{2M}+C_{2S}))+((C_{3M}+C_{3S})-A_2(C_{4M}+C_{4S}))}--$$

Signed and Sealed this

Twenty-first Day of May, 2002

Attest:

*Attesting Officer*

JAMES E. ROGAN
*Director of the United States Patent and Trademark Office*